United States Patent
Lee et al.

(10) Patent No.: US 11,048,923 B2
(45) Date of Patent: Jun. 29, 2021

(54) ELECTRONIC DEVICE AND GESTURE RECOGNITION METHOD THEREOF

(71) Applicant: SAMSUNG ELECTRONICS CO., LTD., Suwon-si (KR)

(72) Inventors: Kihuk Lee, Suwon-si (KR); Chihyun Cho, Suwon-si (KR); Changryong Heo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/590,631

(22) Filed: Oct. 2, 2019

(65) Prior Publication Data

US 2020/0104581 A1 Apr. 2, 2020

(30) Foreign Application Priority Data

Oct. 2, 2018 (KR) .................. 10-2018-0117809

(51) Int. Cl.
*G06K 9/00* (2006.01)
*H04N 5/232* (2006.01)

(52) U.S. Cl.
CPC ..... *G06K 9/00335* (2013.01); *H04N 5/23219* (2013.01); *H04N 5/23232* (2013.01)

(58) Field of Classification Search
CPC ........... G06F 3/017; G06F 2203/04808; G06F 3/04883; H04N 5/23219
See application file for complete search history.

(56) References Cited

U.S. PATENT DOCUMENTS

2004/0199292 A1* 10/2004 Sakagami ............ G05D 1/0274
700/259
2005/0200488 A1* 9/2005 Riley ................. G08B 21/0469
340/573.4

(Continued)

FOREIGN PATENT DOCUMENTS

JP 2007-164360 7/2007
JP 4110998 7/2008

(Continued)

OTHER PUBLICATIONS

International Search Report dated Jan. 13, 2020 in counterpart International Patent Application No. PCT/KR2019/012976.

*Primary Examiner* — Clifford Hilaire
(74) *Attorney, Agent, or Firm* — Nixon & Vanderhye P.C.

(57) ABSTRACT

In various embodiments, an electronic device includes one or more sensors, a driving module comprising driving circuitry configured to move the electronic device, a memory, and a processor. The processor may be configured to execute instructions to control the electronic device to determine a first distance between the electronic device and a user using at least one of the one or more sensors, and to acquire information corresponding to a gesture of the user through at least one of the one or more sensors based on the first distance being within a first predefined range. The processor may be further configured to control the electronic device to move using the driving module, based on the first distance being within a second predefined range, such that the electronic device is located within the first predefined range and acquires the information corresponding to the gesture of the user through at least one of the one or more sensors.

19 Claims, 17 Drawing Sheets

(56) References Cited

U.S. PATENT DOCUMENTS

| | | | |
|---|---|---|---|
| 2005/0286743 A1* | 12/2005 | Kurzweil | G06F 3/017 |
| | | | 382/114 |
| 2008/0253613 A1* | 10/2008 | Jones | G06K 9/00335 |
| | | | 382/103 |
| 2012/0316680 A1 | 12/2012 | Olivier, III et al. | |
| 2013/0222232 A1 | 8/2013 | Kong et al. | |
| 2013/0321826 A1 | 12/2013 | Chen et al. | |
| 2014/0059501 A1* | 2/2014 | Yuu | G06F 3/04883 |
| | | | 715/863 |
| 2014/0100955 A1 | 4/2014 | Osotio et al. | |
| 2017/0104924 A1 | 4/2017 | Holz | |
| 2019/0065027 A1* | 2/2019 | Hauenstein | G06F 3/011 |

FOREIGN PATENT DOCUMENTS

| | | |
|---|---|---|
| JP | 2014-203367 | 10/2014 |
| KR | 10-1330810 | 11/2013 |
| KR | 10-2017-0107341 | 9/2017 |
| WO | 2014/058136 | 4/2014 |

* cited by examiner

FIG. 14
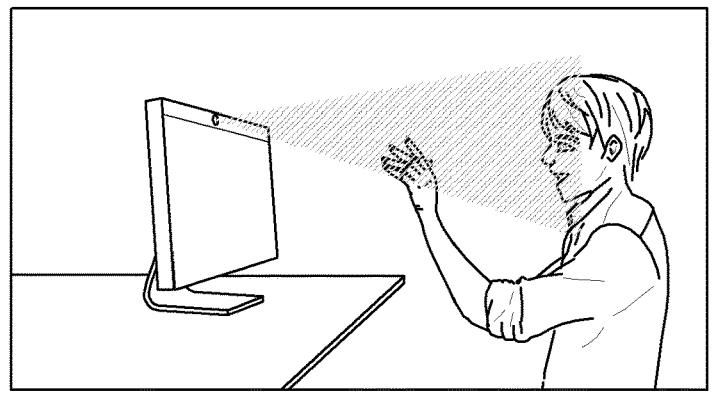
⟨1401⟩
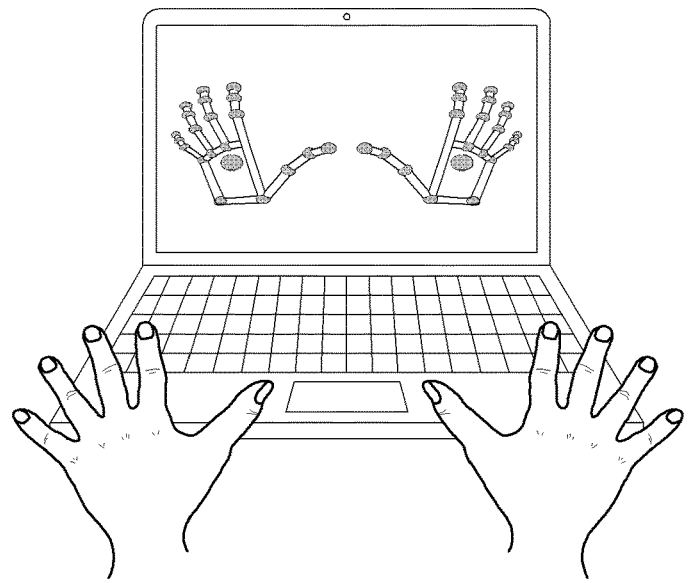
⟨1403⟩
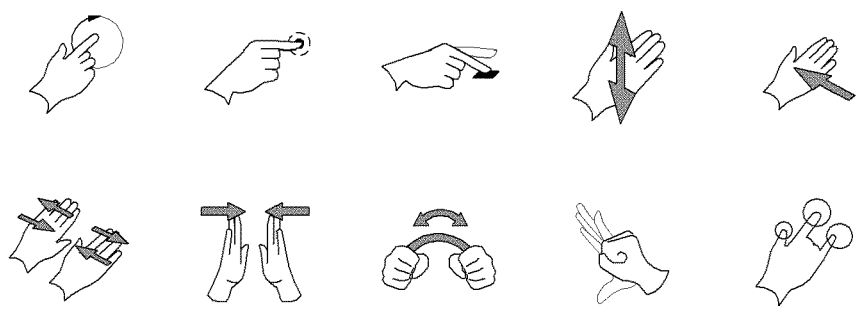
⟨1405⟩

FIG. 15
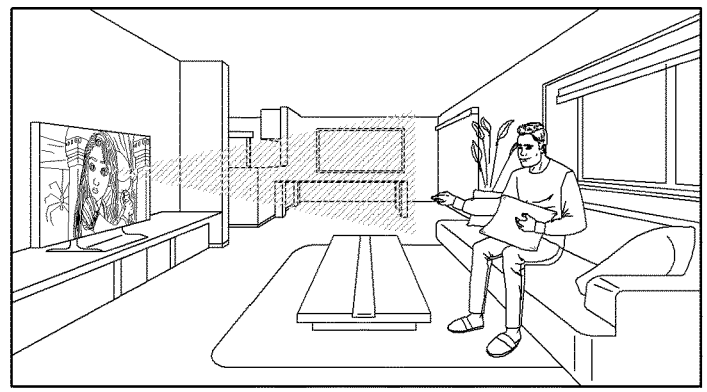
⟨1501⟩
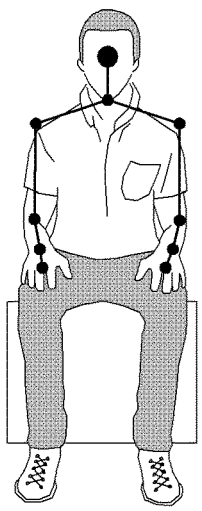
⟨1503⟩
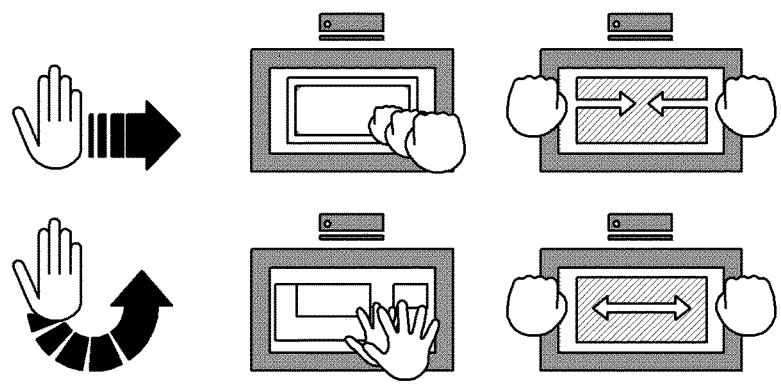
⟨1505⟩

ELECTRONIC DEVICE AND GESTURE RECOGNITION METHOD THEREOF

CROSS-REFERENCE TO RELATED APPLICATION

This application is based on and claims priority under 35 U.S.C. § 119 to Korean Patent Application No. 10-2018-0117809, filed on Oct. 2, 2018, in the Korean Intellectual Property Office, the disclosure of which is incorporated by reference herein in its entirety.

TECHNICAL FIELD

The disclosure relates to an electronic device and a gesture recognition method thereof.

BACKGROUND

Normally an electronic device includes an input device such as a microphone, a mouse, a keyboard, a keypad, or a stylus pen to receive an input command. In addition, the electronic device may recognize a user gesture as an input command and thereby manipulate a user interface.

In the latter case, the electronic device has the capability of recognizing a user gesture through a motion sensor equipped therein or by analyzing an image acquired through a camera equipped therein.

When the electronic device is configured to recognize a user gesture at a fixed or optimized distance from the user, the user who is in a very narrow indoor space may have difficulty in inputting a gesture to electronic device. Further, the electronic device may often fail to recognize a user gesture made at a short distance.

SUMMARY

According to various embodiments of the disclosure an electronic device capable of performing a gesture recognition method while changing a distance from a user in real time is provided.

In addition, the electronic device according to various example embodiments of the disclosure is capable of performing a gesture recognition method by selecting a gesture detection mode suitable for a distance from the user.

According to various example embodiments of the disclosure, an electronic device may include one or more sensors, a driving module comprising driving circuitry configured to move the electronic device, a memory, and a processor. The processor may be configured, by executing instructions, to control the electronic device to determine a first distance between the electronic device and a user using at least one of the one or more sensors, to acquire information corresponding to a gesture of the user through at least one of the one or more sensors based on the first distance being within a first predefined range, and to move the electronic device using the driving module based on the first distance being within a second predefined range, such that the electronic device is located within the first predefined range and acquires the information corresponding to the gesture of the user based on the electronic device being within the first predefined range through at least one of the one or more sensors.

According to various example embodiments of the disclosure, a gesture recognition method of an electronic device may include determining a first distance between the electronic device and a user using at least one of one or more sensors; acquiring information corresponding to a gesture of the user through at least one of the one or more sensors based on the first distance being within a first predefined range; and moving the electronic device using a driving module, based on the first distance being within a second predefined range, such that the electronic device is located within the first predefined range and acquiring the information corresponding to the gesture of the user based on the electronic device being within the first predefined range through at least one of the one or more sensors.

According to various example embodiments of the disclosure, an electronic device may include one or more sensors, a driving module comprising driving circuitry configured to move the electronic device, a memory, and a processor. The processor may be configured, by executing instructions, to control the electronic device to determine a distance between the electronic device and a user using a position detecting sensor of the one or more sensors, to detect a gesture of the user in a first predefined detection mode using a motion detecting sensor of the one or more sensors based on the distance satisfying a first distance range, to detect the gesture of the user in a second predefined detection mode using the motion detecting sensor of the one or more sensors based on the distance satisfying a second distance range, and to perform a predefined action linked to the detected gesture.

According to the electronic device and the gesture recognition method thereof, by changing the distance between the electronic device and the user in real time, it is possible to provide the user with a gesture input environment with reduced space limitation.

According to the electronic device and the gesture recognition method thereof, by changing the distance between the electronic device and the user in real time or changing the gesture detection mode dependent on the distance, it is possible to provide various feedback environments to the user.

According to the electronic device and the gesture recognition method thereof, by changing the distance between the electronic device and the user in real time or changing the gesture detection mode dependent on the distance, it is possible to detect a user gesture through various sensors while reducing power consumption of the electronic device.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 14 is a diagram illustrating an example gesture recognition method at a short distance between an electronic device and a user according to various embodiments of the disclosure;

FIG. 15 is a diagram illustrating an example gesture recognition method at a long distance between an electronic device and a user according to various embodiments of the disclosure;

DETAILED DESCRIPTION

Hereinafter, various example embodiments of the disclosure will be described in greater detail with reference to accompanying drawings.

Figure 1:
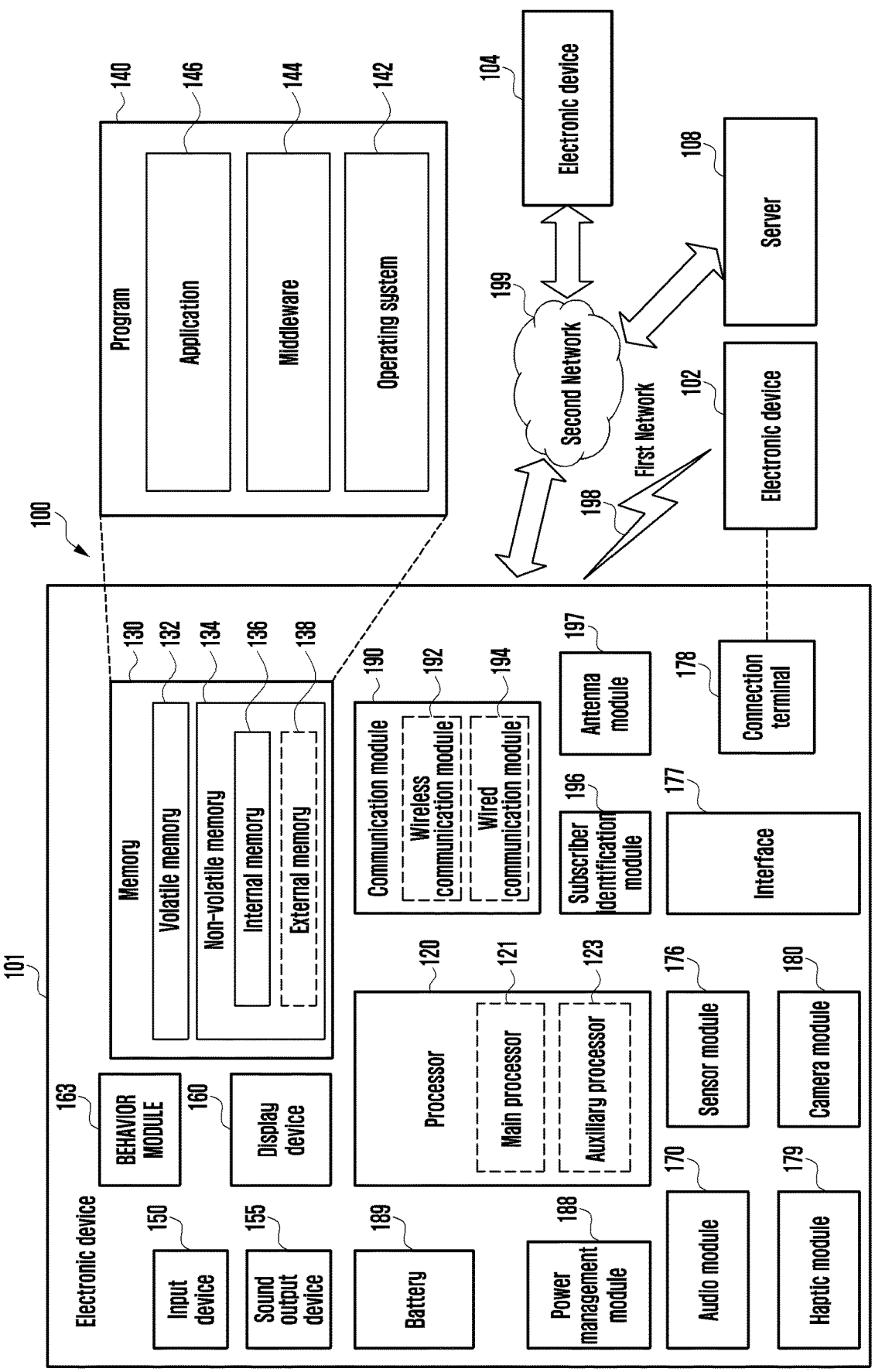
FIG. 1 is a block diagram illustrating an example electronic device in a network environment according to various embodiments of disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, a behavior module 163, an audio module 170, a sensor module 176, an interface 177, connecting terminal 178, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, a keypad, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The behavior module 163 may perform a face change expression, a posture expression, or a travel. According to an embodiment, the behavior module 163 may include a facial expression motor, a posture expression motor, or a driver. The facial expression motor may visually provide, for example, the state of the electronic device 101 via the display device 160. The driver may be used, for example, to move the electronic device 101 or mechanically change other components. The driver may be in a form capable of rotating up/down, left/right, or clockwise/counterclockwise around at least one axis. The driver may be implemented by combining or independently controlling driving motors (e.g., a wheel, a sphere-type wheel, a continuous track, or a propeller).

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes. According to an embodiment, the camera module 180 may include a 2D (e.g., RGB) camera 182 or an infrared-based depth camera 184 (see, e.g., FIG. 2). The camera module 180 may include a lens assembly, a flash, an image sensor, an image stabilizer, a memory (e.g., a buffer memory), or an image signal processor.

The lens assembly may collect light from a subject which is a target of image photographing. The lens assembly may include one or more lenses. According to an embodiment, the camera module 180 may include a plurality of lens assemblies. In this case, the camera module 180 may be, for example, a dual camera, a 360-degree camera, a spherical camera, the 2D camera 182, or the infrared-based depth camera 184. The plurality of lens assemblies may have the same lens properties (e.g., an angle of view, a focal length, an autofocus, an f number, or optical zoom), or at least one lens assembly may have at least one lens property different from that of the other lens assemblies. The lens assembly may include, for example, a wide-angle lens or a telephoto lens. The flash is a special light source to give more light when taking a photograph. The flash may include at least one light emitting diode (e.g., red-green-blue (RGB) LED, white LED, infrared LED, or ultraviolet LED) or a xenon lamp.

The image sensor may convert the light collected from the subject through the lens assembly into an electric signal and thereby acquire an image corresponding to the subject. According to an embodiment, the image sensor may include one image sensor selected from image sensors having different properties, such as an RGB sensor, a black and white (BW) sensor, an IR sensor, or a UV sensor, a plurality of image sensors having the same property, or a plurality of image sensors having different properties. Each image sensor included in the image sensor may be implemented, for example, by a charge-coupled device (CCD) sensor or a complementary metal oxide semiconductor (CMOS) sensor.

The image stabilizer may move at least one lens of the lens assembly or the image sensor in a particular direction or control (e.g., adjust the read-out timing) in order to, when there is a movement of the camera module 180 or the electronic device 101, compensate at least partially for negative effects (e.g., image blur) of such a movement on a captured image. According to an embodiment, the image stabilizer may be implemented as an optical image stabilizer, for example, and may detect the movement using a gyro sensor (not shown) or an acceleration sensor (not shown) disposed inside or outside the camera module 180.

The memory may at least temporarily store at least a part of an image acquired through the image sensor for subsequent image processing operations. For example, if image acquisition is delayed due to a shutter or if a plurality of images are acquired at a high speed, the acquired original image (e.g., a high resolution image) may be stored in the memory, and a corresponding copy image (e.g., a low resolution image) may be previewed through the display device 160. Thereafter, when a specific condition is satisfied (e.g., a user input or a system command), at least a part of the original image stored in the memory may be acquired and processed by the image signal processor. According to an embodiment, the memory may include a buffer memory as at least a part thereof or operating independently.

The image signal processor is capable of performing image processing (e.g., depth map generation, three-dimensional modeling, panorama generation, feature point extraction, image synthesis, or image compensation such as noise reduction, resolution adjustment, brightness adjustment, blurring, sharpening, or softening) for an image acquired through the image sensor or stored in the memory.

Additionally or alternatively, the image signal processor may perform control (e.g., exposure time control or lead-out timing control) for at least one of components (e.g., the image sensor) included in the camera module 180. An image processed by the image signal processor may be stored again in the memory for further processing or may be delivered to an external component (e.g., the memory 130, the display device 160, the electronic device 102 or 104, or the server 108) outside the camera module. According to an embodiment, the image signal processor may be formed of at least a part of the processor 120 or formed of a separate processor running independently of the processor 120. In the latter case, images processed by the image signal processor may be displayed through the display device 160 by the processor 120 without or after additional image processing.

According to an embodiment, the electronic device 101 may include two or more camera modules 180 having different properties or functions. In this case, for example, at least one camera module 180 may be a wide-angle camera or a front camera, and at least one other camera module may be a telephoto camera or a rear camera.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may be formed of a conductor or conductive pattern, and may further have other component (e.g., RFIC). According to an embodiment, the antenna module 197 may include one or more antennas, and, therefrom, at least one antenna appropriate for a communication scheme used in the communication network, such as the first network 198 or the second network 199, may be selected, for example, by the communication module 190. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
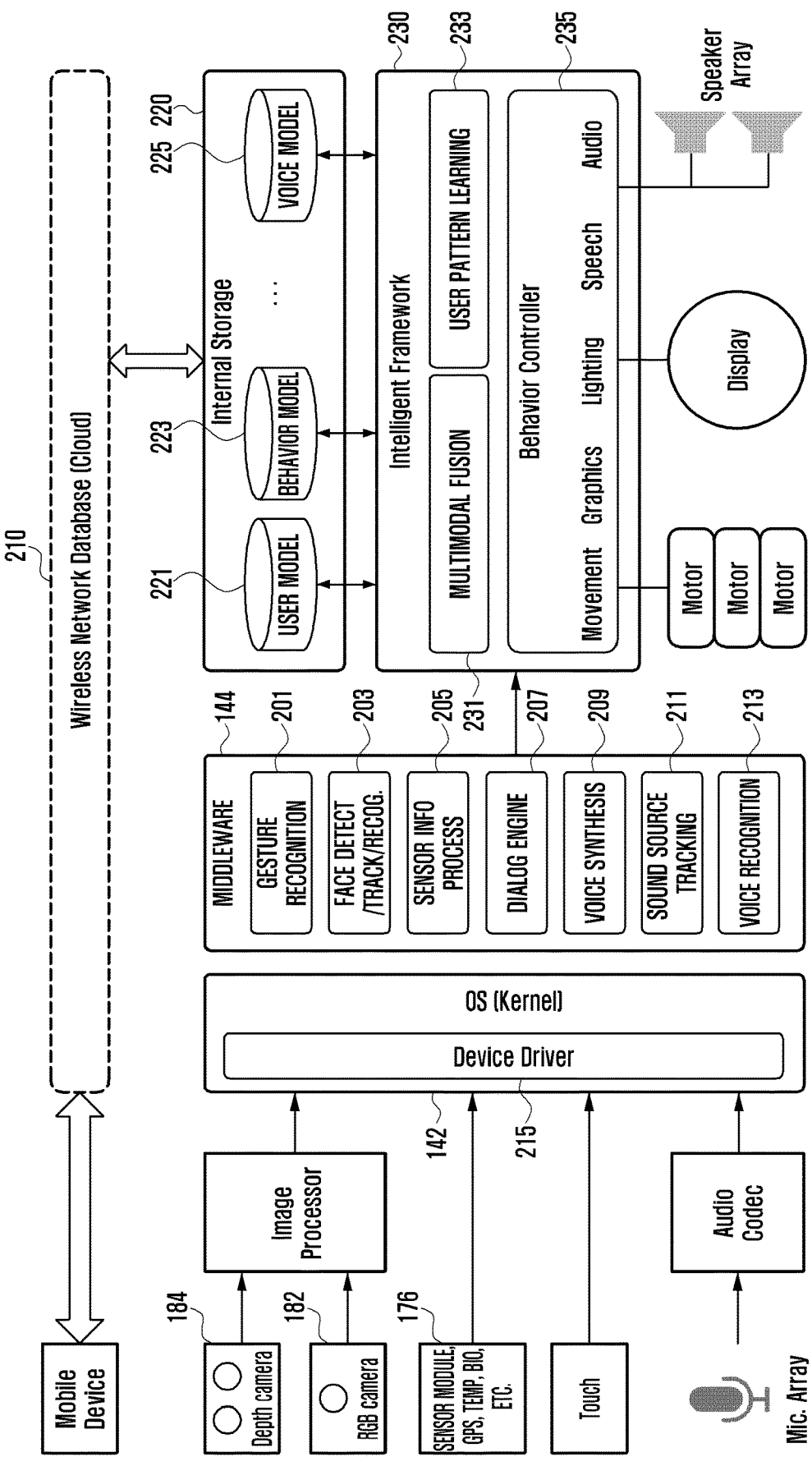
FIG. 2 is a block diagram illustrating example software of an electronic device according to various embodiments of the disclosure.

FIG. 2 is a block diagram illustrating example software of an electronic device according to various embodiments of the disclosure.

Referring to FIG. 2, the software of the electronic device may include an operating system (OS) 142, a middleware 144, an internal storage 220, and/or an intelligent framework 230. The OS 142 controls one or more resources of the electronic device and may include, for example, Android™, iOS™, Windows™, Symbian™, Tizen™, or Bada™. At least some of software programs may be preloaded in the electronic device at the time of manufacture, for example, or downloaded (or updated) from an external electronic device (e.g., the electronic device 102 or 104 or the server 108) when used by the user.

The OS 142 may manage (e.g., allocate or recover) one or more system resources (e.g., processes, memory, or power) of the electronic device. In addition, the OS 142 may include one or more device driver programs 215 for driving other hardware devices of the electronic device 101 such as the input device 150, the sound output device 155, the display device 160, the behavior module 163, the audio module 170, the sensor module 176, the interface 177, the haptic module 179, the camera module 180, the power management module 188, the battery 189, the communication module 190, the SIM 196, and/or the antenna module 197.

The middleware 144 may perform authentication by detecting, tracking, or recognizing a user face through signal-processed data. In addition, the middleware 144 may recognize a user's 3D gesture, track an input position (or a direction of arrival (DOA)) for an audio signal, recognize a voice, and process signals of various sensor data. The middleware 144 may include, for example, a gesture recognition manager 201, a face detection/tracking/recognition manager 203, a sensor information processing manager 205, a dialog engine manager 207, a voice synthesis manager 209, a sound source tracking manager 211, and/or a voice recognition manager 213.

The intelligent framework 230 may include various processing circuitry and/or executable program elements, such as, for example, and without limitation, a multimodal fusion block 231, a user pattern learning block 233, and/or a behavior controller 235. The multimodal fusion block may collect and manage various types of information processed in the middleware 144. The user pattern learning block 233 may extract and learn meaningful information such as a user's life pattern and preference using the information of the multimodal fusion block 231. The behavior controller 235 may output feedback information of the electronic device to the user in the form of movement, graphics (UI/UX), lighting, speech, or audio.

The internal storage 220 may include, for example, a user model DB 221, a behavior model DB 223, or a voice model DB 225. The user model DB 221 may store, for each user, information learned by the intelligent framework 230. The behavior model DB 223 may store information for behavior control of the electronic device. Such information stored in each DB may be stored in or shared with a wireless network DB 210 (e.g., a cloud).

Figure 3:
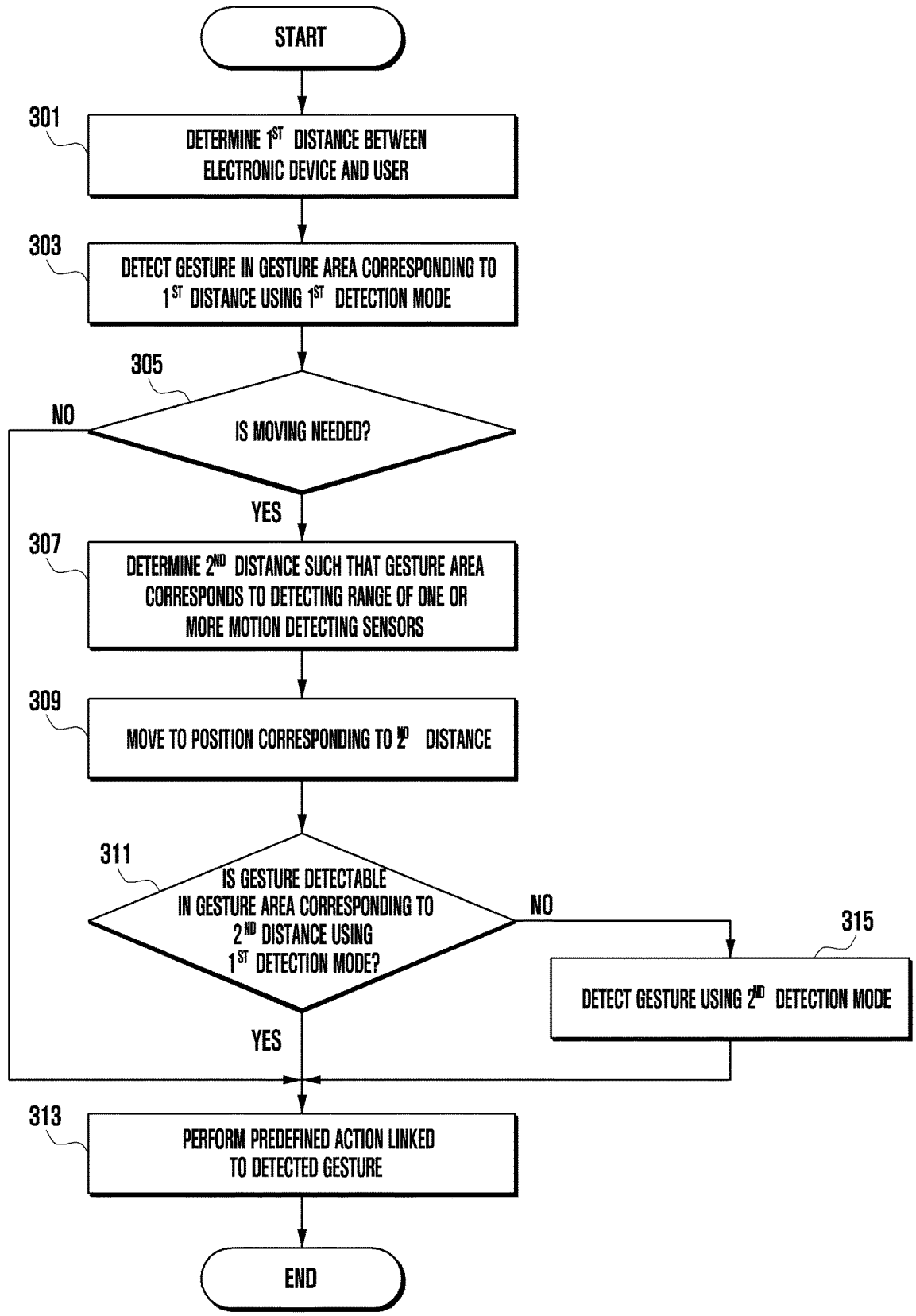
FIG. 3 is a flowchart illustrating an example gesture recognition method of an electronic device according to various embodiments of the disclosure.

FIG. 3 is a flowchart illustrating an example gesture recognition method of an electronic device according to various embodiments of the disclosure.

According to various embodiments, at operation 301, the electronic device 101 may determine a first distance between the electronic device 101 and the user using one or more sensors under the control of the processor 120.

In various embodiments, the one or more sensors may include, for example, and without limitation, a proximity light sensor, a three-dimensional (3D) depth sensor, a gesture sensor, an acceleration sensor, a gyro sensor, a geomagnetic sensor, an infrared (IR) sensor, an ultrasonic sensor, a microphone, a camera sensor, a radio frequency (RF) sensor, and/or a touch sensor (or display), or the like.

The proximity light sensor may be a proximity sensor and/or an illuminance sensor, and may be a sensor included in the sensor module 176. The 3D depth sensor may be the depth camera 184. The camera sensor may be one of a dual camera, a 360-degree camera, a spherical camera, the 2D camera 182, or an infrared-based depth camera 184. The 3D depth sensor and the camera sensor may comprise the camera module 180.

Using one or more sensors, the electronic device 101 may measure and determine the distance between the electronic device 101 and the user.

For example, the 3D depth sensor may include an IR emitter and a depth image CMOS. Using a time difference when an IR signal emitted from the IR emitter is reflected by a certain object (e.g., a user) and returned, it is possible to measure the distance between the electronic device 101 and the object (e.g., the user).

In various embodiments, the camera sensor may acquire and process an image containing a certain object (e.g., a user), determine the size of the object contained in the image, and thereby measure the distance between the electronic device 101 and the object (e.g., the user).

In various embodiments, when the user wears a communicable accessory (e.g., a wearable device such as the external electronic device 102 or 104 in FIG. 1), the RF sensor may measure the received signal strength indication (RSSI) of a signal received from the accessory and thereby determine the distance between the electronic device 101 and the user. The RF sensor may be the communication module 190 capable of communicating with the external electronic device 102 or 104 shown in FIG. 1.

In various embodiments, it is possible to detect a sound signal (e.g., a voice, a clapping sound, a tramping feet sound, etc.) generated by the user, calculate a sound signal transmission time, and thereby measure the distance between the electronic device 101 and the user.

According to various embodiments, at operation 303, under the control of the processor 120, the electronic device 101 may detect a user gesture in a gesture area corresponding to the determined first distance using a first detection mode.

In various embodiments, the electronic device 101 may store a gesture recognition algorithm in the memory 130. Also, based on the gesture recognition algorithm, the electronic device 101 may process the user gesture detected in the gesture area.

In various embodiments, based on the gesture recognition algorithm, the electronic device 101 may track the movements or shapes of joints connecting user's head, arm, shoulder, hand, and the like (e.g., moving hand left or right, drawing a circle with hand, moving hand back and forth, moving hands closer or farther, etc.), and thereby recognize a user gesture. The recognized gesture may be used as an input command.

In various embodiments, the priority of gesture recognition dependent on the distance may be defined differently according to a user's selection. In various embodiments, according to the gesture recognition algorithm, the electronic device 101 may be configured to recognize first a gesture made by a motion of a relatively large joint such as arm or head, based on the distance (e.g., when the distance between the electronic device 101 and the user is long). In various embodiments, according to the gesture recognition algorithm, the electronic device 101 may be configured to recognize first a finger gesture having a small motion, based on the distance (e.g., when the distance is short). In various embodiments, according to the gesture recognition algorithm, the electronic device 101 may be configured to recognize various gestures from the movements or shapes of finger joints, based on the distance (e.g., when the distance is short).

According to various embodiments, at operation 305, under the control of the processor 120, the electronic device 101 may determine whether moving (e.g., repositioning) the electronic device 101 is needed.

In various embodiments, the operation 305 may be dependent on the distance between the electronic device 101 and the user, and on specific content that is mainly executed at the distance.

In various embodiments, the operation 305 may be dependent on the type of an application associated with the electronic device 101.

In various embodiments, when an application requiring face recognition or an application requiring depth measurement is being executed in the external electronic device (e.g., 102, 104, or 108) or the electronic device 101, the electronic device 101 may determine whether to move, based on the type of the executed application.

For example, in case where the user's face or upper body is recognized as a gesture at the first distance, sensing the motion of the entire region may be needed in order to determine the user's whole body gesture. In this example, the electronic device 101 may determine that moving (i.e., repositioning) thereof is needed.

For example, when any game content requiring a large motion is executed in close proximity, the electronic device 101 may determine whether to move such that an effective gesture area can contain the whole body. In another example, when any content, such as a browser or a video player, requiring a relatively small motion is executed, the electronic device 101 may determine whether to move such that an effective gesture area can contain only the hand or head.

In various embodiments, the operation 305 may be performed based on a user's request.

In various embodiments, in case of failing to recognize a gesture even though the gesture is received, the electronic device 101 may determine that moving thereof is needed to receive the gesture again.

When determining that moving is needed, the electronic device 101 may then perform operation 307 under the control of the processor 120. When determining that moving is not needed, the electronic device 101 may then perform operation 313 under the control of the processor 120.

According to various embodiments, at the operation 307, under the control of the processor 120, the electronic device 101 may determine a second distance between the user and the electronic device 101 such that the gesture area corresponds to a detecting range of one or more motion detecting sensors. The second distance is a distance necessary for recognizing a user's body region required for gesture recognition. The second distance may be longer or short than the first distance.

According to various embodiments, at operation 309, under the control of the processor 120, the electronic device 101 may move to a position corresponding to the determined second distance by controlling the behavior module 163 to run the driver.

According to various embodiments, at operation 311, under the control of the processor 120, the electronic device 101 may determine whether it is possible to detect a user gesture in a gesture area corresponding to the determined second distance using the first detection mode.

According to various embodiments, when it is determined at the operation 311 that it is possible to detect a user gesture in a gesture area corresponding to the second distance, the electronic device 101 may detect the user gesture using the first detection mode and perform operation 313.

According to various embodiments, when it is determined at the operation 311 that it is not possible to detect a user gesture in a gesture area corresponding to the second distance, the electronic device 101 may perform operation 315.

According to various embodiments, at the operation 315, under the control of the processor 120, the electronic device 101 may change from the first detection mode to a second detection mode and detect the user gesture using the second detection mode.

For example, the gesture area corresponding to the first distance recited in the operation 303 and the gesture area corresponding to the second distance recited in the operation 311 may have different area values dependent on the first and second distances.

According to various embodiments, at the operation 313, under the control of the processor 120, the electronic device 101 may perform a predefined action linked to the gesture detected in the gesture area. For example, as described above, the user gesture may be detected in the gesture area corresponding to the first distance using the first detection mode at the operation 303, detected in the gesture area corresponding to the second distance using the first detection mode after the operation 311, or detected in the gesture area corresponding to the second distance using the second detection mode at the operation 315. The predefined action linked to the detected gesture may be performed at the operation 313.

According to various embodiments, the predefined action linked to the detected gesture may, for example, and without limitation, be turning the lighting on or off, entering a letter, controlling the content being displayed (e.g., moving the content, controlling the playback of the content), connecting to an external device, controlling the external device, etc.

According to various embodiments, the first detection mode and the second detection mode may have the following example differences, but the disclosure is not limited thereto.

In various embodiments, the electronic device 101 may independently control each photodiode input of a pixel array of the camera module 180 and also independently control (on or off) pixels according to a predefined (based on factors such as a distance) resolution necessary for recognizing a user gesture input.

For example, when the user makes a gesture, the image sensor of the camera module 180 may recognize the gesture in the first detection mode (e.g., a low-resolution mode such as 8×8 pixels) or in the second detection mode (e.g., a mid-resolution mode such as 64×64 pixels, or a high-resolution mode such as full pixels).

In various embodiments, the image sensor of the camera module 180 may include a color filter layer for filtering the light incident on the photodiode by wavelength. In general, four filters of RGBG comprise a group corresponding to one pixel. Such a group of four filters may be arranged in a quadra- or tetra-pattern.

According to various embodiments, when operating in the first detection mode (e.g., a low-resolution mode), the electronic device 101 may recognize data of one pixel corresponding to the RGBG filter group as a single pixel itself. When operating in the second detection mode (e.g., a monochrome mode), the electronic device 101 may operate the color filter in the form of recognizing only one color (e.g., black and white) other than RGBG, thereby increasing the resolution.

According to various embodiments, when the group of four filters of RGBG is arranged in the quadra- or tetra-pattern, the electronic device 101 that operates in the first detection mode (e.g., a low-resolution mode) may recognize interpolated pixel data corresponding to the RGBG filter group as a single pixel itself. The RGBG filter group may be interpolated using, for example, the Bayer interpolation technique. The electronic device 101 that operates in the second detection mode (e.g., a high-resolution mode) may operate all pixels to increase the resolution.

According to various embodiments, in the first detection mode, the electronic device 101 may enable the IR emitter of the IR sensor to sparsely scan the light to a target area where the user is present. Also, in the second detection mode, the electronic device 101 may enable the IR emitter of the IR sensor to densely scan the light to the target area where the user is present. The electronic device 101 may change the density of scanning the light through the IR emitter by changing a mask or lens disposed in front of the IR emitter.

Figure 4:
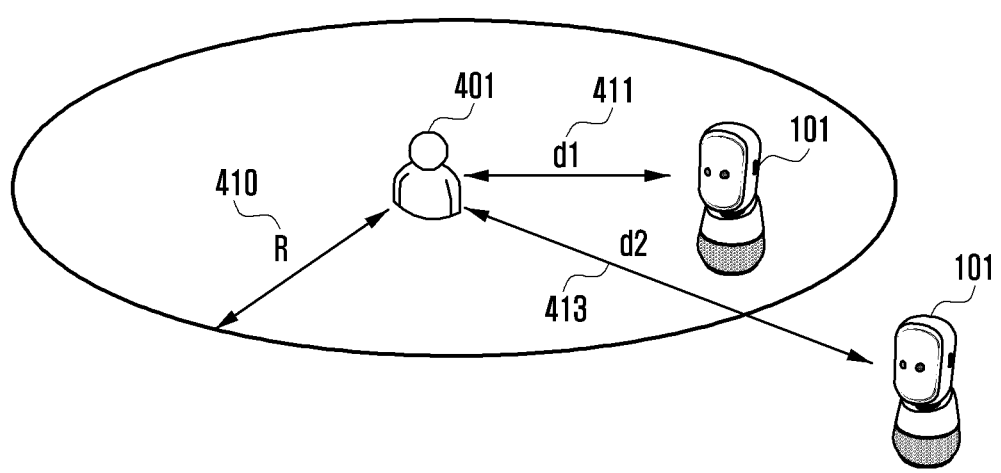
FIG. 4 is a diagram illustrating an example repositioning operation of an electronic device for gesture recognition according to various embodiments of the disclosure.

FIG. 4 is a diagram illustrating an example repositioning operation of an electronic device for gesture recognition according to various embodiments of the disclosure.

According to various embodiments, a distance 410 between the electronic device 101 and a user 401 may be changed by the movement of the electronic device 101. Using one or more sensors under the control of the processor 120, the electronic device 101 may determine a first distance 411 between the electronic device 101 and the user 401. Under the control of the processor 120, the electronic device 101 may detect a user gesture in a gesture area corresponding to the determined first distance 411. In addition, under the control of the processor 120, the electronic device 101 may determine whether any movement thereof is needed. If so, the electronic device 101 may, under the control of the processor 120, determine a second distance 413 between the electronic device 101 and the user 401 using one or more sensors and move to a position corresponding to the determined second distance 413 by controlling the behavior module 163 to run the driver included therein.

According to various embodiments, determining whether any movement of the electronic device 101 is needed may be performed based on a user's request. When determining that the movement is needed, the electronic device 101 may run the driver in the behavior module 163 to move from a position corresponding to the first distance 411 to another position corresponding to the second distance 413.

According to various embodiments, if a user gesture is not recognized even after moving from a position corresponding to the first distance 411 to another position corresponding to the second distance 413, the electronic device 101 may change from the first detection mode to the second detection mode.

Figure 5:
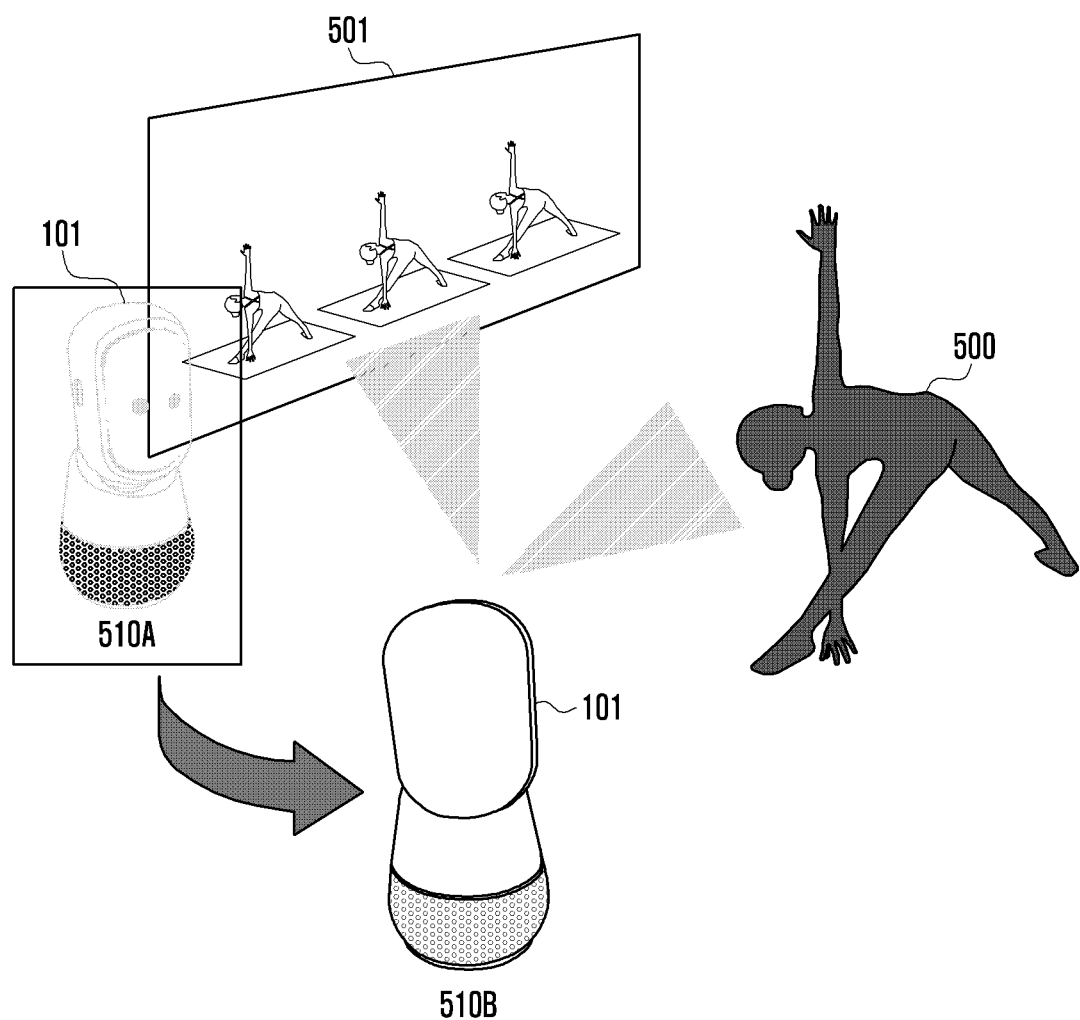
FIG. 5 is a diagram illustrating an example repositioning and detection mode selecting operation of an electronic device for gesture recognition according to various embodiments of the disclosure.

FIG. 5 is a diagram illustrating an example repositioning and detection mode selecting operation of an electronic device for gesture recognition according to various embodiments of the disclosure.

According to various embodiments, the electronic device 101 may, under the control of the processor 120, determine a first distance between the electronic device 101 and the user 500 using one or more sensors.

When the user 500 is not moving, a distance between the electronic device 101 located at a first position 510A and the user 500 will be referred to as a first distance, and a distance between the electronic device 101 located at a second position 510B and the user 500 will be referred to as a second distance.

Under the control of the processor 120, the electronic device 101 may detect a gesture of the user 500 in a gesture area corresponding to the determined first distance using a first detection mode.

Under the control of the processor 120, the electronic device 101 may determine whether the movement of the electronic device 101 is necessary. This determining operation may, for example, be dependent on a distance between the electronic device 101 and the user 500, and on specific content that is mainly executed at the distance.

An external electronic device 501 and the electronic device 101 may be in a state of communication connection.

The electronic device 101 may identify content being displayed (or being executed) in the external electronic device 501.

For example, when yoga content is being displayed in the external electronic device 501, and when the user 500 follows a yoga gesture while seeing the yoga content, the electronic device 101 may move to a position (e.g., the second position 510B) that allows detecting a full body gesture of the user 500. For example, the electronic device 101 may control the behavior module 163 to run the driver under the control of the processor 120, and thereby move to the second position 510B. At the second moved position 510B, the electronic device 101 may detect a gesture of the user 500 in the first detection mode under the control of the processor 120.

In various embodiments, if the electronic device 101 fails to recognize a gesture of the user 500 even though trying to detect the user gesture at the second position 510B in the first detection mode under the control of the processor 120, the electronic device 101 may detect the user gesture in the second detection mode.

For example, for gesture recognition, the electronic device 101 may first change a position (e.g., move), and change a detection mode under the control of the processor 120.

According to various embodiments, under the control of the processor 120, the electronic device 101 may determine, based on the type of an application associated with the electronic device 101, whether to move. Based on a determination result, the electronic device 101 may move from the first position 510A to the second position 510B by running the driver of the behavior module 163.

For example, when an application requiring face recognition or an application requiring depth measurement is being executed in the external electronic device (e.g., 102, 104, or 108) or the electronic device 101, the electronic device 101 may determine that moving is needed, and thereby move from the first position 510A to the second position 510B by running the driver of the behavior module 163.

Figure 6:
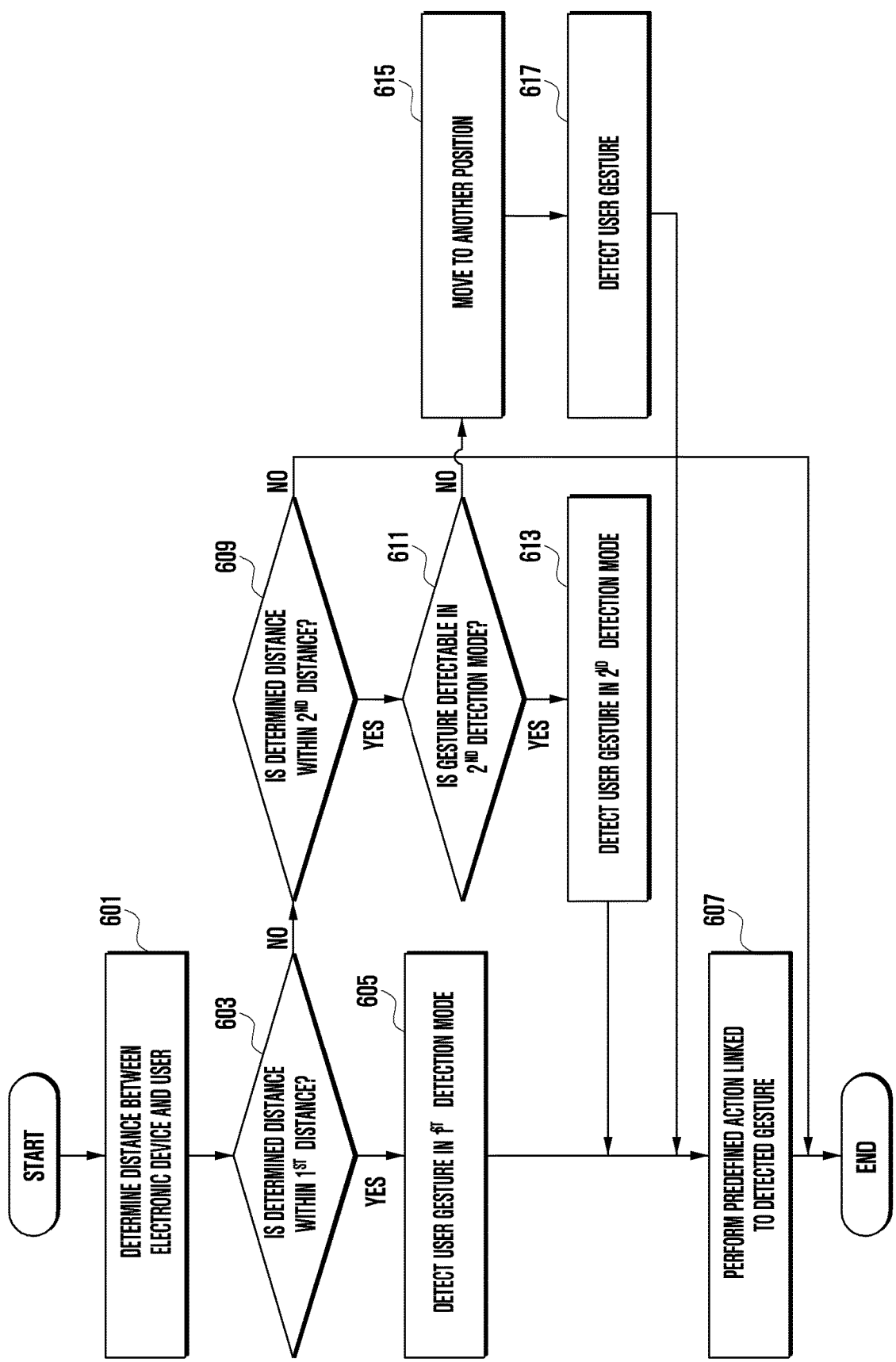
FIG. 6 is a flowchart illustrating an example repositioning and detection mode selecting operation of an electronic device for gesture recognition according to various embodiments of the disclosure.

FIG. 6 is a flowchart illustrating an example repositioning and detection mode selecting operation of an electronic device for gesture recognition according to various embodiments of the disclosure.

According to various embodiments, at operation 601, the electronic device 101 may, under the control of the processor 120, determine a distance between the electronic device 101 and a user using one or more sensors.

In various embodiments, the one or more sensors may include, for example, and without limitation, a proximity light sensor, a three-dimensional (3D) depth sensor, a gesture sensor, an acceleration sensor, a gyro sensor, a geomagnetic sensor, an infrared (IR) sensor, an ultrasonic sensor, a microphone, a camera sensor, a radio frequency (RF) sensor, and/or a touch sensor (or display), or the like.

The proximity light sensor may be a proximity sensor and/or an illuminance sensor, and may be a sensor included in the sensor module 176. The 3D depth sensor may be the depth camera 184. The camera sensor may be one of a dual camera, a 360-degree camera, a spherical camera, the 2D camera 182, or an infrared-based depth camera 184. The 3D depth sensor and the camera sensor may comprise the camera module 180.

Using one or more sensors, the electronic device 101 may measure and determine the distance between the electronic device 101 and the user.

For example, the 3D depth sensor including an IR emitter and a depth image CMOS. Using a time difference when an IR signal emitted from the IR emitter is reflected by a certain object (e.g., a user) and returned, it is possible to measure the distance between the electronic device 101 and the object (e.g., the user).

In various embodiments, the camera sensor may acquire and process an image containing a certain object (e.g., a user), determine the size of the object contained in the image, and thereby measure the distance between the electronic device 101 and the object (e.g., the user).

In various embodiments, when the user wears a communicable accessory (e.g., a wearable device such as the external electronic device 102 or 104 in FIG. 1), the RF sensor may measure the received signal strength indication (RSSI) of a signal received from the accessory and thereby determine the distance between the electronic device 101 and the user. The RF sensor may be the communication module 190 capable of communicating with the external electronic device 102 or 104 shown in FIG. 1.

In various embodiments, it is possible to detect a sound signal (e.g., a voice, a clapping sound, a tramping feet sound, etc.) generated by the user, calculate a sound signal transmission time, and thereby measure the distance between the electronic device 101 and the user.

According to various embodiments, at operation 603, under the control of the processor 120, the electronic device 101 may determine whether the determined distance is within a first distance.

When the determined distance is within the first distance, the electronic device 101 may perform operation 605 under the control of the processor 120. When the determined distance is not within the first distance, the electronic device 101 may perform operation 609 under the control of the processor 120.

At the operation 605, under the control of the processor 120, the electronic device 101 may detect a user gesture in a first detection mode within the first distance.

In various embodiments, the electronic device 101 may store a gesture recognition algorithm in the memory 130. Also, based on the gesture recognition algorithm, the electronic device 101 may process the user gesture detected in the gesture area.

In various embodiments, based on the gesture recognition algorithm, the electronic device 101 may track the movements or shapes of joints connecting user's head, arm, shoulder, hand, and the like (e.g., moving hand left or right, drawing a circle with hand, moving hand back and forth, moving hands closer or farther, etc.), and thereby recognize a user gesture. The recognized gesture may be used as an input command.

In various embodiments, the priority of gesture recognition dependent on the distance may be defined differently according to a user's selection. In various embodiments, according to the gesture recognition algorithm, the electronic device 101 may be configured to recognize first a gesture made by a motion of a relatively large joint such as arm or head, based on the distance (e.g., when the distance between the electronic device 101 and the user is long). In various embodiments, according to the gesture recognition algorithm, the electronic device 101 may be configured to recognize first a finger gesture having a small motion, based on the distance (e.g., when the distance is short). In various embodiments, according to the gesture recognition algorithm, the electronic device 101 may be configured to recognize various gestures from the movements or shapes of finger joints, based on the distance (e.g., when the distance is short).

According to various embodiments, at operation 607, under the control of the processor 120, the electronic device 101 may perform a predefined action linked to the gesture detected in the first detection mode.

In various embodiments, under the control of the processor 120, the electronic device 101 may determine the distance thereof and change the detection mode, based on the type of an application associated with the electronic device 101.

In various embodiments, when an application requiring face recognition or an application requiring depth measurement is being executed in the external electronic device (e.g., 102, 104, or 108) or the electronic device 101, the electronic device 101 may determine whether to change the detection mode, based on the type of the executed application.

For example, in case where the user's face or upper body is recognized as a gesture at the first distance, sensing the motion of the entire region may be needed in order to determine the user's whole body gesture. In this case, the electronic device 101 may determine that a change of the detection mode is needed.

In various embodiments, based on a user's request, the electronic device 101 may determine whether to change the detection mode.

Meanwhile, when it is determined at the operation 603 that the determined distance is not within the first distance, the electronic device 101 may determine, at operation 609, under the control of the processor 120, whether the determined distance is within a second distance. In various embodiments, the first distance may be shorter or longer than the second distance.

When the determined distance is within the second distance, the electronic device 101 may perform operation 611 under the control of the processor 120. When the determined distance is not within the second distance, the electronic device 101 may terminate a gesture recognition process under the control of the processor 120.

In various embodiments, at the operation 611, under the control of the processor 120, the electronic device 101 may determine whether it is possible to detect the user gesture in the second detection mode.

When it is possible to detect the user gesture in the second detection mode, the electronic device 101 may perform operation 613 under the control of the processor 120. When it is not possible to detect the user gesture in the second detection mode, the electronic device 101 may perform operation 615 under the control of the processor 120.

At the operation 613, the electronic device 101 may detect the user gesture in the second detection mode under the control of the processor 120. At the operation 607, under the control of the processor 120, the electronic device 101 may perform a predefined action linked to the gesture detected in the second detection mode.

At the operation 615, the electronic device 101 may move to another position to change the distance from the user under the control of the processor 120.

In various embodiments, at the operation 615, under the control of the processor 120, the electronic device 101 may move to a position corresponding to a distance shorter than the distance determined at the operation 601.

In various embodiments, after finishing the movement for changing the distance from the user at the operation 615, the electronic device 101 may detect, at operation 617, the user gesture in the first or second detection mode under the control of the processor 120. At the operation 607, under the control of the processor 120, the electronic device 101 may perform a predefined action linked to the gesture detected in the first or second detection mode.

The first detection mode and the second detection mode may, for example, and without limitation, have the following differences.

In various embodiments, the electronic device 101 may independently control each photodiode input of a pixel array of the camera module 180 and also independently control (on or off) pixels according to a predefined (based on factors such as a distance) resolution necessary for recognizing a user gesture input.

For example, when the user makes a gesture at the first distance (e.g., a short distance such as 30 cm), the image sensor of the camera module 180 may recognize the gesture in the first detection mode (e.g., a low-resolution mode such as 8×8 pixels). However, when the user makes a gesture at the second distance (e.g., a medium distance such as 1 m or a long distance such as 3 m), the image sensor of the camera module 180 may recognize the gesture in the second detection mode (e.g., a mid-resolution mode such as 64×64 pixels, or a high-resolution mode such as full pixels). It is therefore possible to provide the same recognition rate (e.g. 20 speckle recognition) regardless of distance.

In various embodiments, the image sensor of the camera module 180 may include a color filter layer for filtering the light incident on the photodiode by wavelength. In general, four filters of RGBG comprise a group corresponding to one pixel. Such a group of four filters may be arranged in a quadra- or tetra-pattern.

According to various embodiments, when operating in the first detection mode (e.g., a low-resolution mode) at the first distance (e.g., a short distance), the electronic device 101 may recognize data of one pixel corresponding to the RGBG filter group as a single pixel itself. When operating in the second detection mode (e.g., a monochrome mode) at the second distance (e.g., a long distance), the electronic device 101 may operate the color filter in the form of recognizing only one color (e.g., black and white) other than RGBG thereby increasing the resolution.

According to various embodiments, when the group of four filters of RGBG is arranged in the quadra- or tetra-pattern, the electronic device 101 that operates in the first detection mode (e.g., a low-resolution mode) at the first distance (e.g., a short distance) may recognize interpolated pixel data corresponding to the RGBG filter group as a single pixel itself. The RGBG filter group may be interpolated using the Bayer interpolation technique. The electronic device 101 that operates in the second detection mode (e.g., a high-resolution mode) at the second distance (e.g., a long distance) may operate all pixels to increase the resolution.

According to various embodiments, the electronic device 101 may be configured to enable a particular portion of the color filter to pass the IR wavelength when the distance is further away. This can improve the recognition rate of a gesture at a long distance (e.g., the second distance) by recognizing the IR light reflected from the outside.

According to various embodiments, in the first detection mode, the electronic device 101 may enable the IR emitter of the IR sensor to sparsely scan the light to a target area where the user is present at the first distance (e.g., a short distance). Also, in the second detection mode, the electronic device 101 may enable the IR emitter of the IR sensor to densely scan the light to the target area where the user is present at the second distance (e.g., a long distance). The electronic device 101 may change the density of scanning the light through the IR emitter by changing a mask or lens disposed in front of the IR emitter.

According to various embodiments, when the distance between the electronic device 101 and the user is the second distance beyond a distance (e.g., the first distance) at which the 3D sensor normally operates, the electronic device 101 may recognize a motion of an external electronic device (e.g., the electronic device 102 or 104, or a wearable device) mounted on the hand making a gesture through a motion/gesture detection module in the external electronic device rather than recognize a motion of the hand through a distance image sensor (i.e., time of flight (ToF)). For example, the motion/gesture detection module of the external electronic device may detect the motion of the external electronic device and transmit motion/gesture information to the electronic device 101 to recognize a gesture input.

According to various embodiments, the electronic device 101 may vary a gesture input area of the user depending on a distance between the user and the electronic device 101. When the user is at the first distance (e.g., a short distance) from the electronic device 101, the electronic device 101 may operate in the first detection mode (e.g., a mode for finger gesture input). In this mode, the electronic device 101 may recognize each individual finger gesture, thus enabling a detailed gesture input such as character input. In addition, when the user is at the second distance (e.g., a long distance) or more from the electronic device 101, the electronic device 101 may operate in the second detection mode (e.g., a mode for upper body gesture input). In this mode, the electronic device 101 may recognize mainly a user's arm motion. Also, when the user is further away from the electronic device 101, the electronic device 101 may recognize a gesture through a user's full body.

According to various embodiments, the motion/gesture detection module of the electronic device 101 obtains information on a distance between the electronic device and the user. In case of a relatively short distance (e.g., 1 to 3 cm), the electronic device may track the position of a gesture input object (e.g., hand) only in a proximity area including user's head/chest. Also, in case of a relatively medium distance (e.g., 1 m), the electronic device may track the position of a gesture input object (e.g., arm) in an area including a user's upper body. In case of a relatively long distance (e.g., 3 m), the electronic device may track the position of a gesture input object (e.g., body) in an area including a user's full body.

According to various embodiments, depending on a distance between the electronic device 101 and the gesture input object, the same gesture may be recognized with different gesture sizes. In order to compensate for this, a scale factor may be determined and used. For example, when a hand moves by 10 cm from left to right at the first distance, this hand motion may have a size of 100 pixels in the entire image for recognition. When the same motion is performed at the second distance, the hand motion may have a size of 25 pixels in the entire image for recognition. In such cases, the depth sensor may recognize a ratio of the second distance to the first distance between the electronic device and the user, and thus the hand motion may be scaled to generate a scaled gesture. Therefore, using a scale factor, the electronic device 101 may detect a gesture scaled in the first detection mode at the first distance, and may also detect a gesture scaled in the second detection mode at the second distance.

Figure 7:
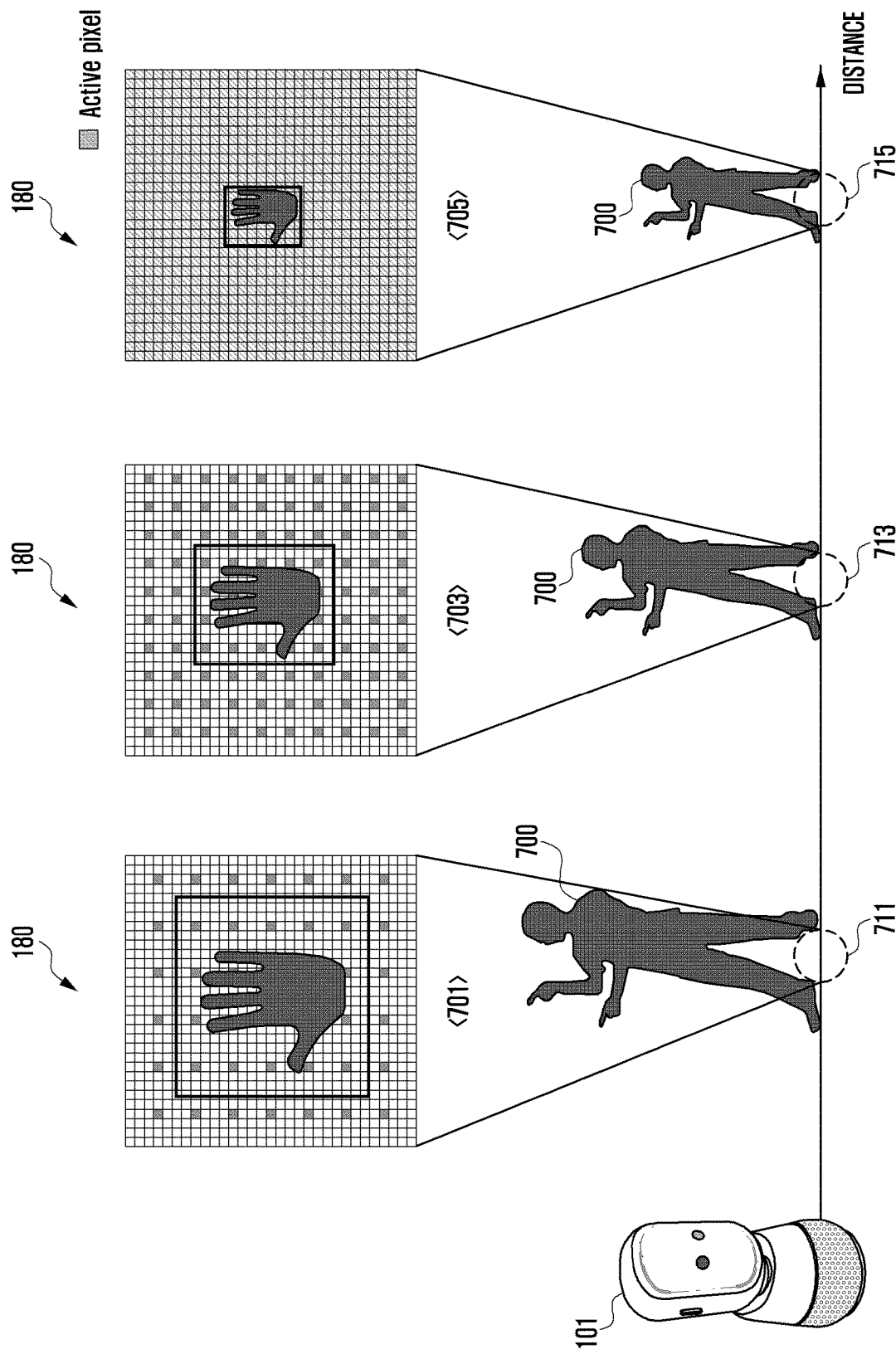
FIG. 7 is a diagram illustrating an example change in detection mode of an electronic device for gesture recognition according to various embodiments of the disclosure.

FIG. 7 is a diagram illustrating an example change in detection mode of an electronic device for gesture recognition according to various embodiments of the disclosure.

In various embodiments, the electronic device 101 may independently control each photodiode input of a pixel array of the camera module 180 and may independently control (on or off) pixels according to a predefined (based on factors such as a distance) resolution necessary for recognizing a user gesture input.

For example, when the user 700 makes a gesture at the first distance (e.g., a short distance 711), the image sensor of the camera module 180 may recognize the gesture in the first detection mode (e.g., a low-resolution mode 701 such as 8×8 pixels). However, when the user 700 makes a gesture at the second distance (e.g., a medium distance 713 or a long distance 715), the image sensor of the camera module 180 may recognize the gesture in the second detection mode (e.g., a mid-resolution mode 703 such as 64×64 pixels, or a high-resolution mode 705 such as full pixels). It is therefore possible to provide the same recognition rate (e.g. 20 speckle recognition) regardless of distance.

Figure 8:
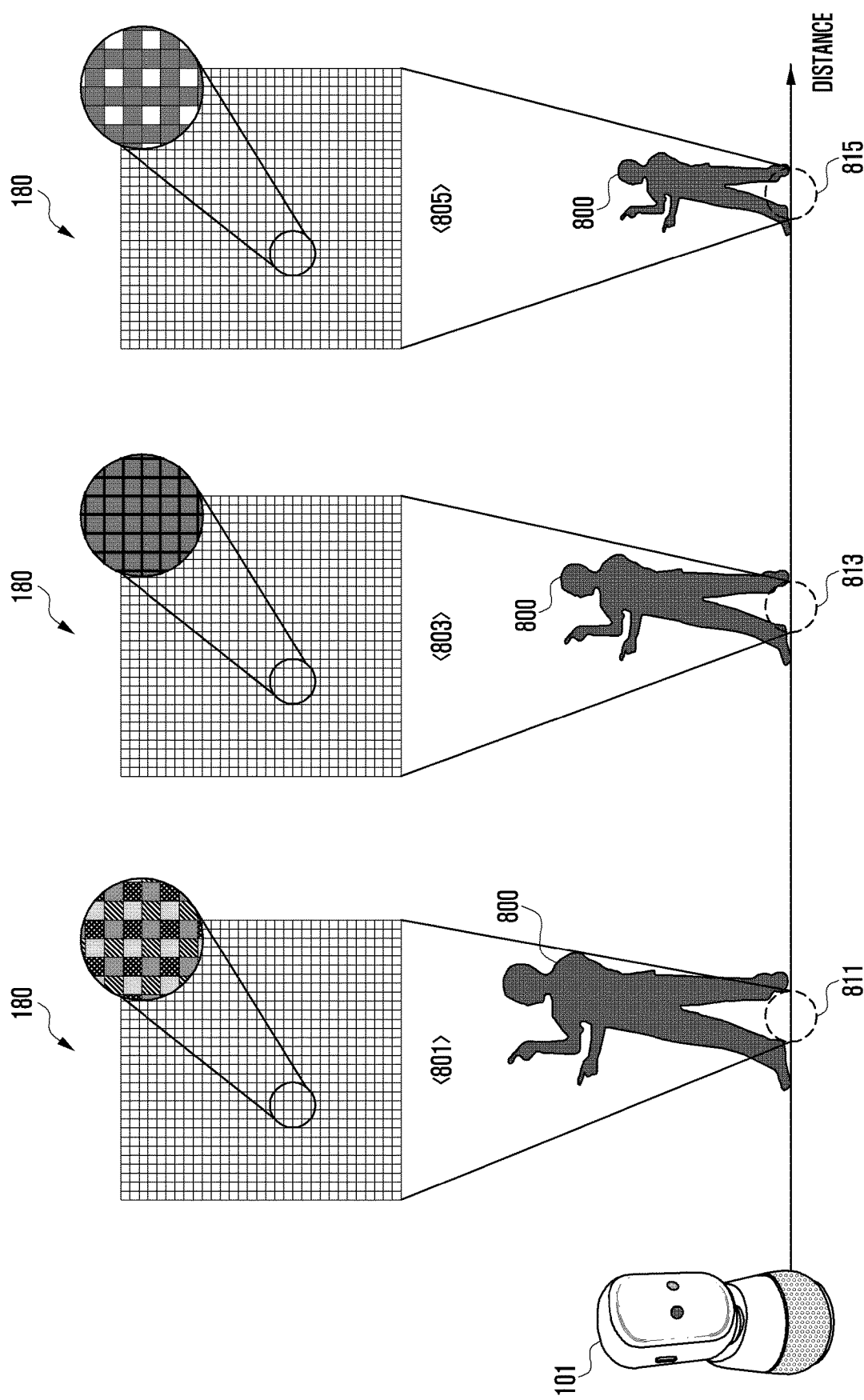
FIG. 8 is a diagram illustrating an example change in detection mode of an electronic device for gesture recognition according to various embodiments of the disclosure.

FIG. 8 is a diagram illustrating an example change in detection mode of an electronic device for gesture recognition according to various embodiments of the disclosure.

In various embodiments, the image sensor of the camera module 180 may include a color filter layer for filtering the light incident on the photodiode by wavelength. In addition, the electronic device 101 may control the color filter layer, based on the detection mode.

In general, four filters of RGBG comprise a group corresponding to one pixel. Such a group of four filters may be arranged in a quadra- or tetra-pattern.

According to various embodiments, when the user 800 makes a gesture at the first distance (e.g., a short distance 811), and when the electronic device 101 operates in the first detection mode (e.g., a low-resolution mode 801), the electronic device 101 may recognize data of one pixel corresponding to the RGBG filter group as a single pixel itself.

In addition, when the user 800 makes a gesture at the second distance (e.g., a medium distance 813), and when the electronic device 101 operates in the second detection mode (e.g., a monochrome mode 803), the electronic device 101 may operate the color filter in the form of recognizing only one color (e.g., black and white) other than RGBG, thereby increasing the resolution.

According to various embodiments, when the user 800 makes a gesture at the second distance (e.g., a long distance 815), the electronic device 101 may be configured to enable a particular portion of the color filter to further pass the IR wavelength as well in the second detection mode 805. This can improve the recognition rate of a gesture at a long distance by recognizing the IR light reflected from the outside.

According to various embodiments, when the group of four filters of RGBG is arranged in the quadra- or tetra-pattern, and when the user 800 makes a gesture at the first distance 811, the electronic device 101 that operates in the first detection mode 801 (e.g., a low-resolution mode) may recognize interpolated pixel data corresponding to the RGBG filter group as a single pixel itself. The RGBG filter group may be interpolated using the Bayer interpolation technique. When the user 800 makes a gesture at the second distance 813 or 815, the electronic device 101 that operates in the second detection mode 803 or 805 may operate all pixels to increase the resolution.

Figure 9:
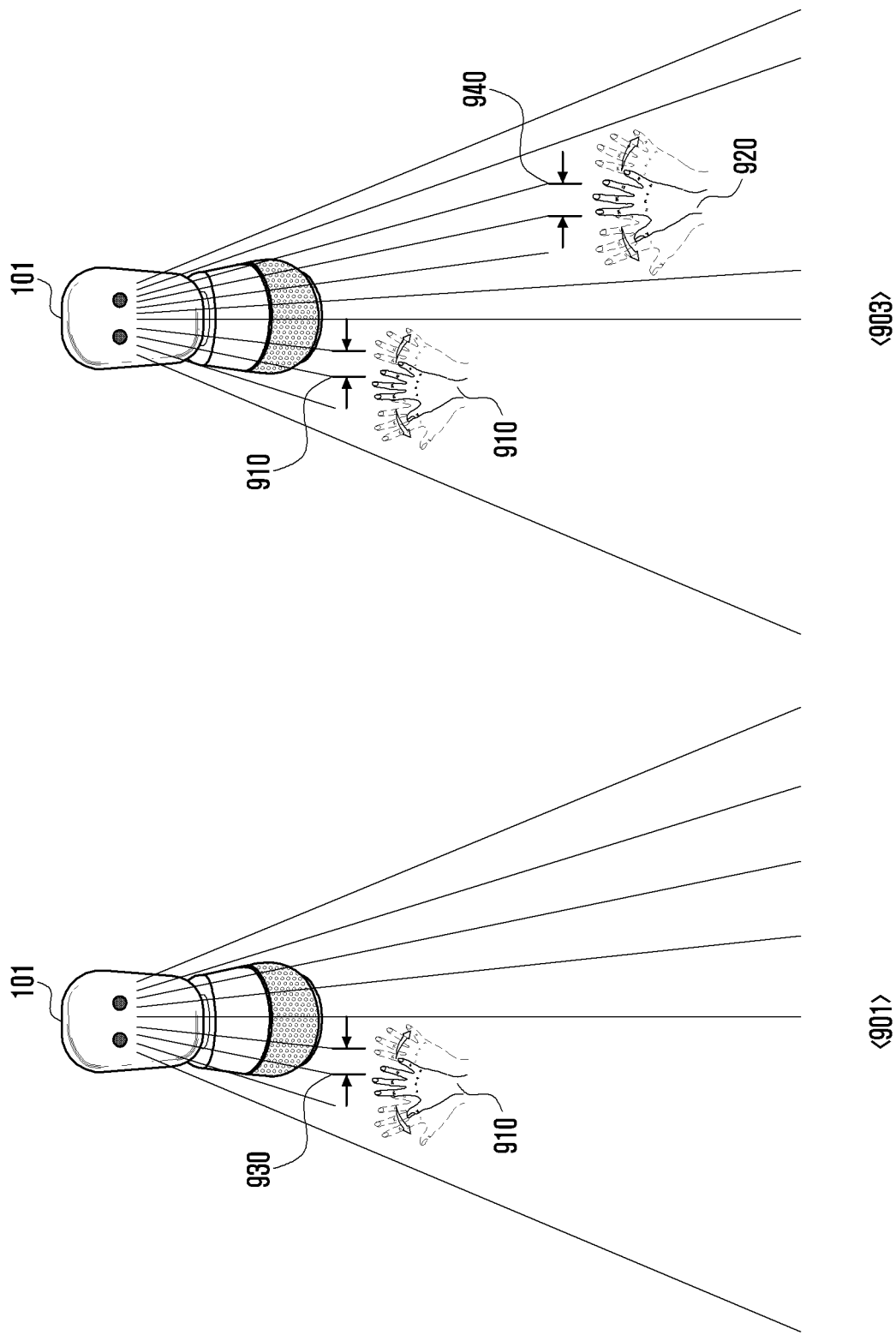
FIG. 9 is a diagram illustrating an example change in detection mode of an electronic device for gesture recognition according to various embodiments of the disclosure.

FIG. 9 is a diagram illustrating an example change in detection mode of an electronic device for gesture recognition according to various embodiments of the disclosure.

According to various embodiments, depending on a distance from the user, the electronic device 101 may change a mask or lens disposed in front of the IR emitter of the IR sensor under the control of the processor 120 so as to change the density of scanning the light at the IR emitter of the IR sensor.

For example, with respect to the user located at the first distance 910, the electronic device 101 may enable the IR emitter to scan the light with a first gap 930 in the first detection mode 901.

Also, with respect to the user located at the second distance 920, the electronic device 101 may enable the IR emitter to scan the light with a second gap 940 in the second detection mode 903. When the second distance 920 is greater than the first distance 910, the second gap 940 may be smaller than the first gap 930.

Figure 10:
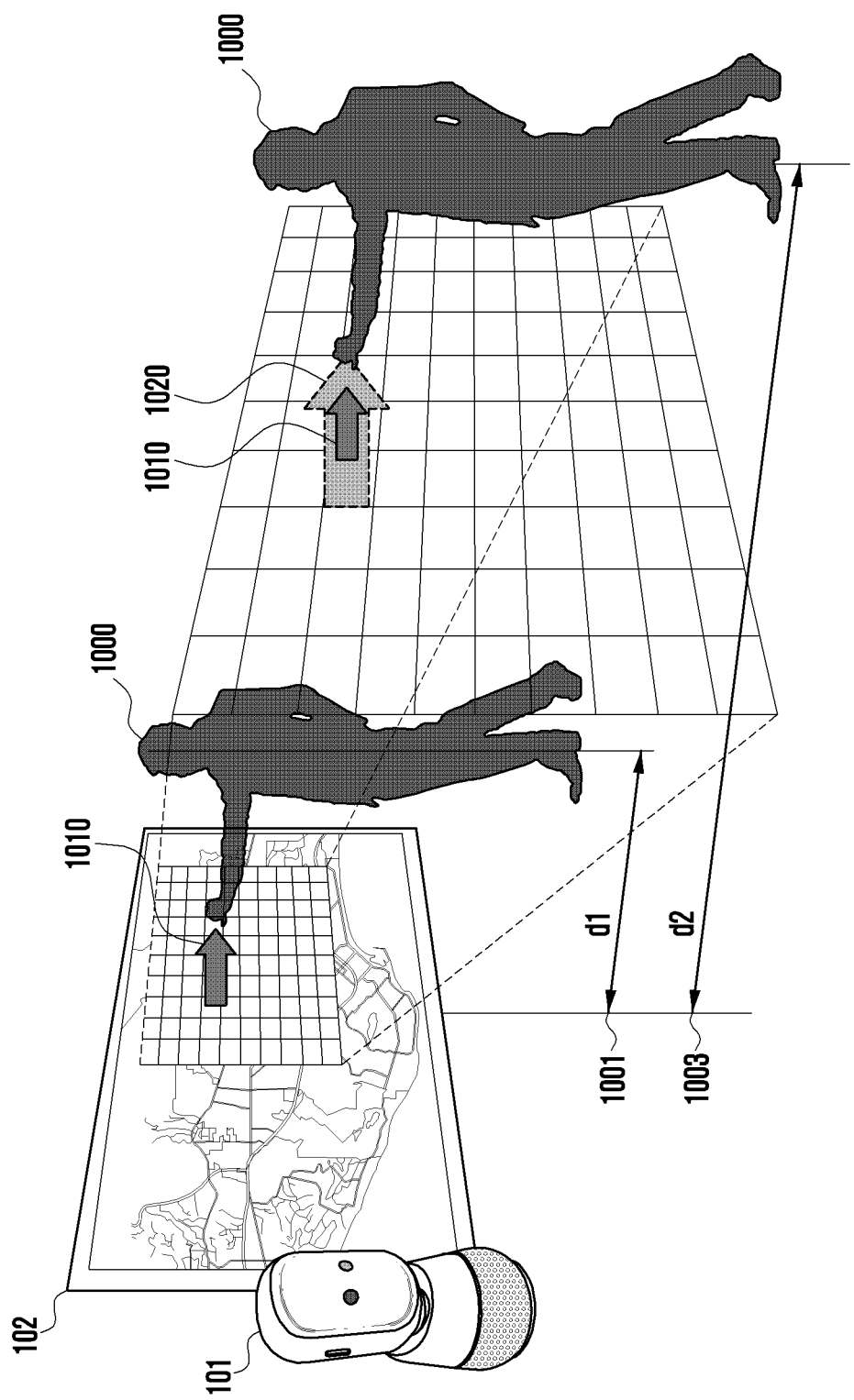
FIG. 10 is a diagram illustrating an example repositioning and detection mode changing operation of an electronic device for gesture recognition according to various embodiments of the disclosure.

FIG. 10 is a diagram illustrating an example repositioning and detection mode changing operation of an electronic device for gesture recognition according to various embodiments of the disclosure.

According to various embodiments, under the control of the processor 120, the electronic device 101 may compensate for a gesture input using a scale factor according to a distance.

In various embodiments, when a distance between the electronic device 101 and the user 1000 making a gesture is varied, the electronic device 101 may recognize the gesture as having different gesture sizes even though the same gesture is recognized. In order to compensate for this, a scale factor may be determined and used. For example, when a hand moves by 10 cm from left to right as a scroll gesture at the first distance 1001, this hand motion may have a size of 100 pixels in the entire image for recognition as indicated by reference numeral 1010. When the same motion is performed at the second distance 1003, the hand motion may have a size of 25 pixels in the entire image for recognition as indicated by reference numeral 1010. In such cases, the depth sensor may recognize a ratio of the second distance to the first distance between the electronic device 101 and the user 1000, so that the hand motion may be scaled to generate a scaled gesture 1020.

Therefore, using a scale factor, the electronic device 101 may detect a gesture scaled in the first detection mode at the first distance, and detect a gesture scaled in the second detection mode at the second distance. In case of failing to recognize the gesture scaled in the second detection mode at the second distance, the electronic device 101 may move to another position to find a recognizable distance as described at the operation 615 above in FIG. 6.

Figure 11:
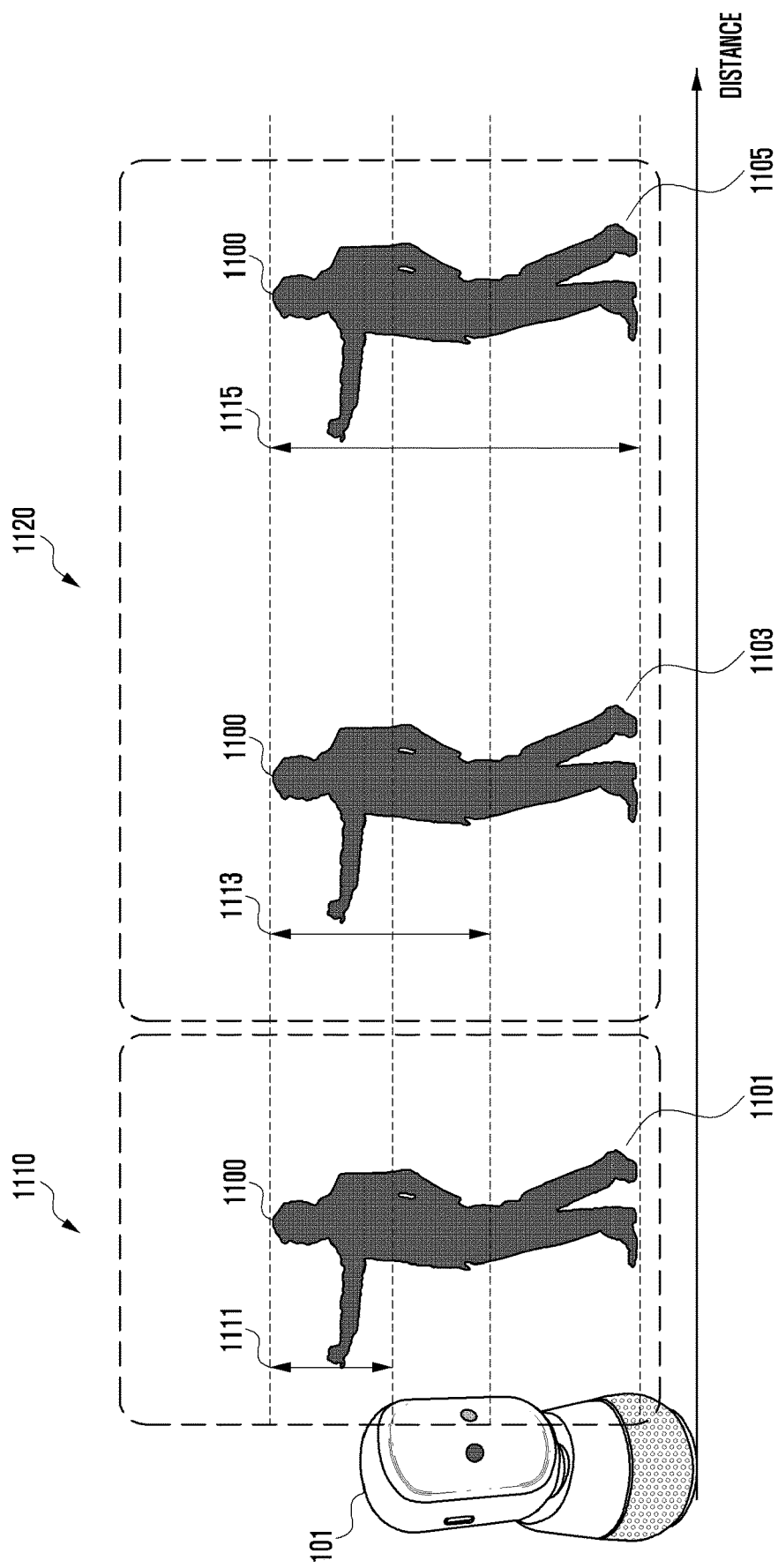
FIG. 11 is a diagram illustrating an example repositioning and detection mode changing operation of an electronic device for gesture recognition according to various embodiments of the disclosure.

FIG. 11 is a diagram illustrating an example repositioning and detection mode changing operation of an electronic device for gesture recognition according to various embodiments of the disclosure.

According to various embodiments, the electronic device 101 may differently set a gesture input area of the user 1100, depending on a distance between the user 1100 and the electronic device 101. When the user 1100 is at the first distance 1101 from the electronic device 101, the electronic device 101 may operate in the first detection mode 1110 (e.g., a mode for finger gesture input). In this mode, the electronic device 101 may recognize each individual finger gesture 1111, thus enabling a detailed gesture input such as character input. When the user 1100 is at the second distance 1103 greater than the first distance 1101 from the electronic device 101, the electronic device 101 may operate in the second detection mode 1120 while setting a user's upper body 1113 as the gesture input area. In this mode, the electronic device 101 may recognize mainly a user's arm motion. When the user is at another second distance 1105 from the electronic device 101, the electronic device 101 may recognize a gesture through a user's full body 1115.

According to various embodiments, the motion/gesture detection module of the electronic device 101 obtains information on a distance between the electronic device 101 and the user 1100. When the distance is determined as the first distance 1101, the electronic device may track the position of a gesture input object (e.g., hand) only in a proximity area including user's head/chest. Also, when the distance is determined as the second distance 1103, the electronic device may track the position of a gesture input object (e.g., arm) in an area including a user's upper body. When the distance is determined as another second distance 1105, the electronic device may track the position of a gesture input object (e.g., body) in an area including a user's full body. In case of failing to recognize the user gesture at the second distance 1105, the electronic device 101 may move to another position to find a recognizable distance as described at the operation 615 above in FIG. 6.

Figure 12:
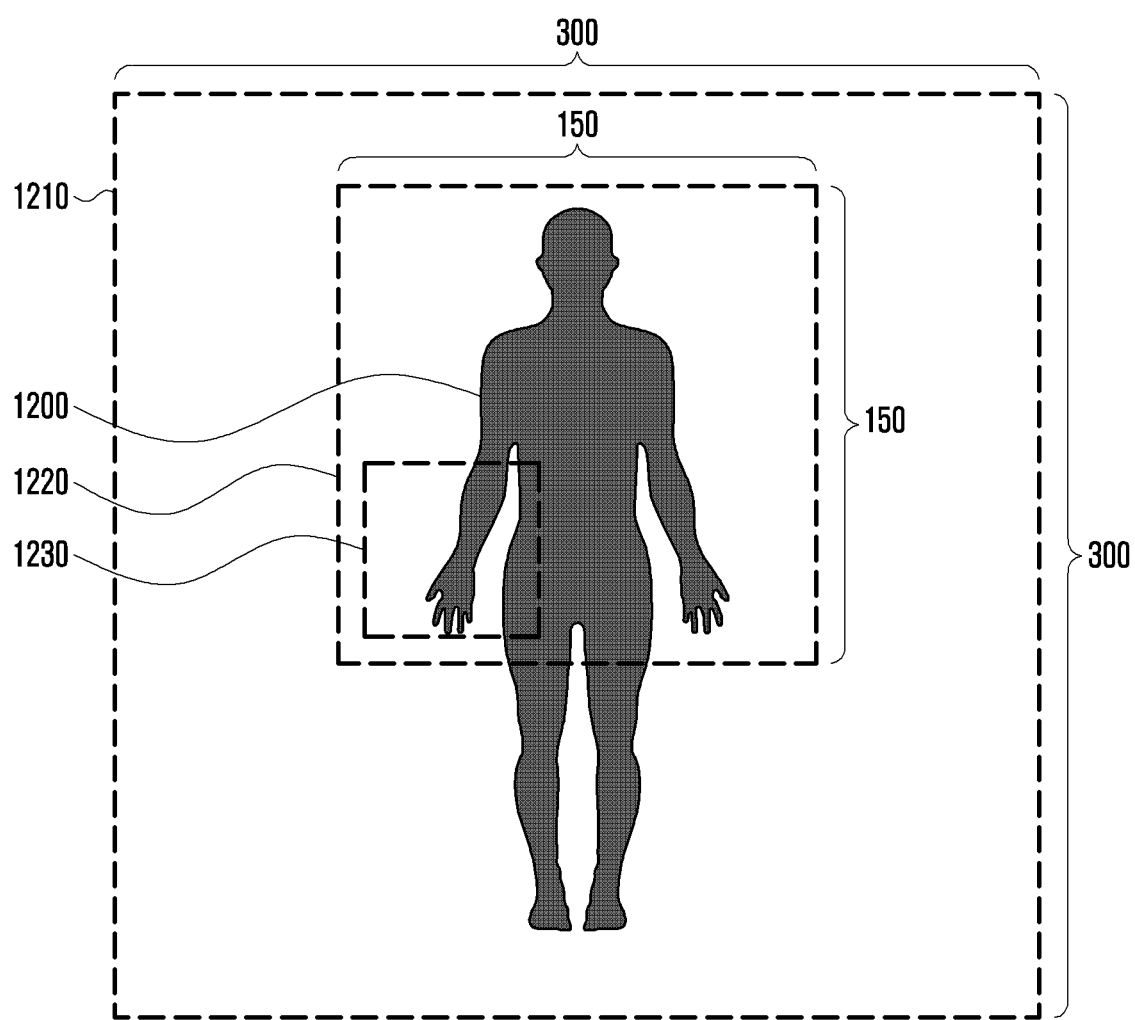
FIG. 12 is a diagram illustrating examples of gesture detection areas according to various embodiments of the disclosure.

FIG. 12 is a diagram illustrating examples of gesture detection areas according to various embodiments of the disclosure.

According to various embodiments, when varying a recognition range in a situation where a distance between the user 1200 and the electronic device 101 is unvaried, processed data size and consumed power may be varied in recognizing a user gesture. FIG. 12 shows three examples of recognition ranges, e.g., gesture detection areas. In different gesture detection areas, the number of active pixels of the camera module 180, the power consumption, and the processing speed are different. As shown in Table 1 below, full body tracking 1210 may require more active pixels (e.g., 300×300) and more power consumption in comparison with upper body tracking 1220 (e.g., 150×150) and hand tracking 1230.

TABLE 1

| Gesture detection area | Active pixels | Power consumption | Processing speed |
| --- | --- | --- | --- |
| Full body tracking | 300 * 300 | 20 mW | More than 1 ms |
| Upper body tracking | 150 * 150 | 15 mW | More than 1 ms |
| Hand tracking | 50 * 50 | 7 mW | More than 0.5 ms |

When the gesture detection area is designated, the electronic device 101 may turn on only pixels corresponding to the gesture detection area in the camera module 180 and turn off the remaining pixels.

The active pixels refer to particular pixels that correspond to the gesture detection area and are turned on. However, in an example embodiment, the remaining pixels other than the gesture detection area may not be necessarily turned off. In this case, the gesture detection area may be densely recognized, whereas the other area may be sparsely recognized.

Figure 13:
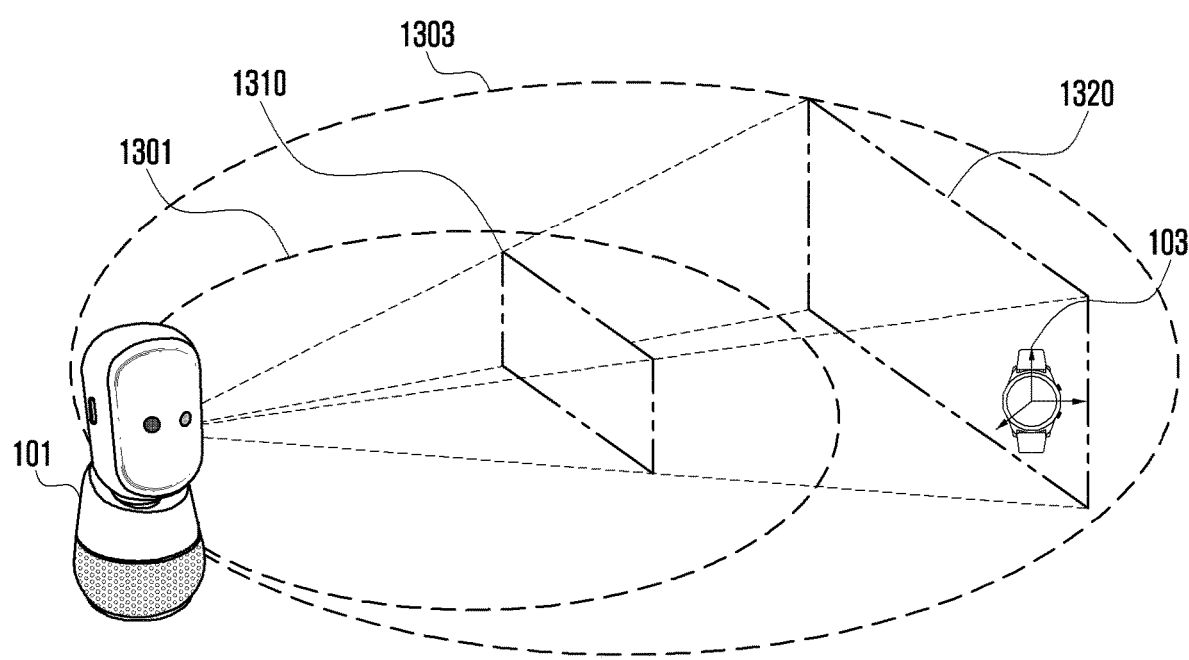
FIG. 13 is a diagram illustrating an example change in detection mode of an electronic device for gesture recognition according to various embodiments of the disclosure.

FIG. 13 is a diagram illustrating an example change in detection mode of an electronic device for gesture recognition according to various embodiments of the disclosure.

According to various embodiments, when the user is located at a second distance 1303 corresponding to a second gesture detection area 1320 out of a first distance 1301 corresponding to a first gesture detection area 1310, the electronic device 101 may recognize a motion of an external electronic device 103 (e.g., a wearable device) mounted on the hand making a gesture through a motion/gesture detection module in the external electronic device 103 rather than recognize a motion of the hand through a distance image sensor (e.g., time of flight (ToF)). For example, the motion/gesture detection module of the external electronic device 103 may detect the motion of the external electronic device and transmit motion/gesture information to the electronic device 101 to recognize a gesture input.

FIG. 14 is a diagram illustrating an example gesture recognition method at a short distance between an electronic device and a user according to various embodiments of the disclosure.

As indicated by reference numeral 1401, based on the distance (e.g., when the distance between the electronic device 101 and the user is short), the electronic device 101 may be configured to recognize first a finger gesture having a small motion according to the gesture recognition algorithm under the control of the processor 120.

In addition, as indicated by reference numeral 1403, based on the distance (e.g., when the distance between the electronic device 101 and the user is short), the electronic device 101 may be configured to recognize various hand gestures from the movements or shapes of finger joints according to the gesture recognition algorithm under the control of the processor 120.

Reference numeral 1405 indicates various examples of finger/hand gestures recognizable at a short distance.

FIG. 15 is a diagram illustrating an example gesture recognition method at a long distance between an electronic device and a user according to various embodiments of the disclosure.

As indicated by reference numeral 1501, based on the distance (e.g., when the distance between the electronic device 101 and the user is long), the electronic device 101 may be configured to recognize first a gesture made by a motion of a relatively large joint such as arm or head according to the gesture recognition algorithm under the control of the processor 120.

In addition, as indicated by reference numeral 1503, the electronic device 101 may track the movements or shapes of joints connecting user's head, arm, shoulder, hand, and the like (e.g., moving hand left or right, drawing a circle with hand, moving hand back and forth, moving hands closer or farther, etc.), and thereby recognize a user gesture according to the gesture recognition algorithm under the control of the processor 120.

Reference numeral 1505 indicates various examples of recognized gestures to be used as input commands.

Figure 16:
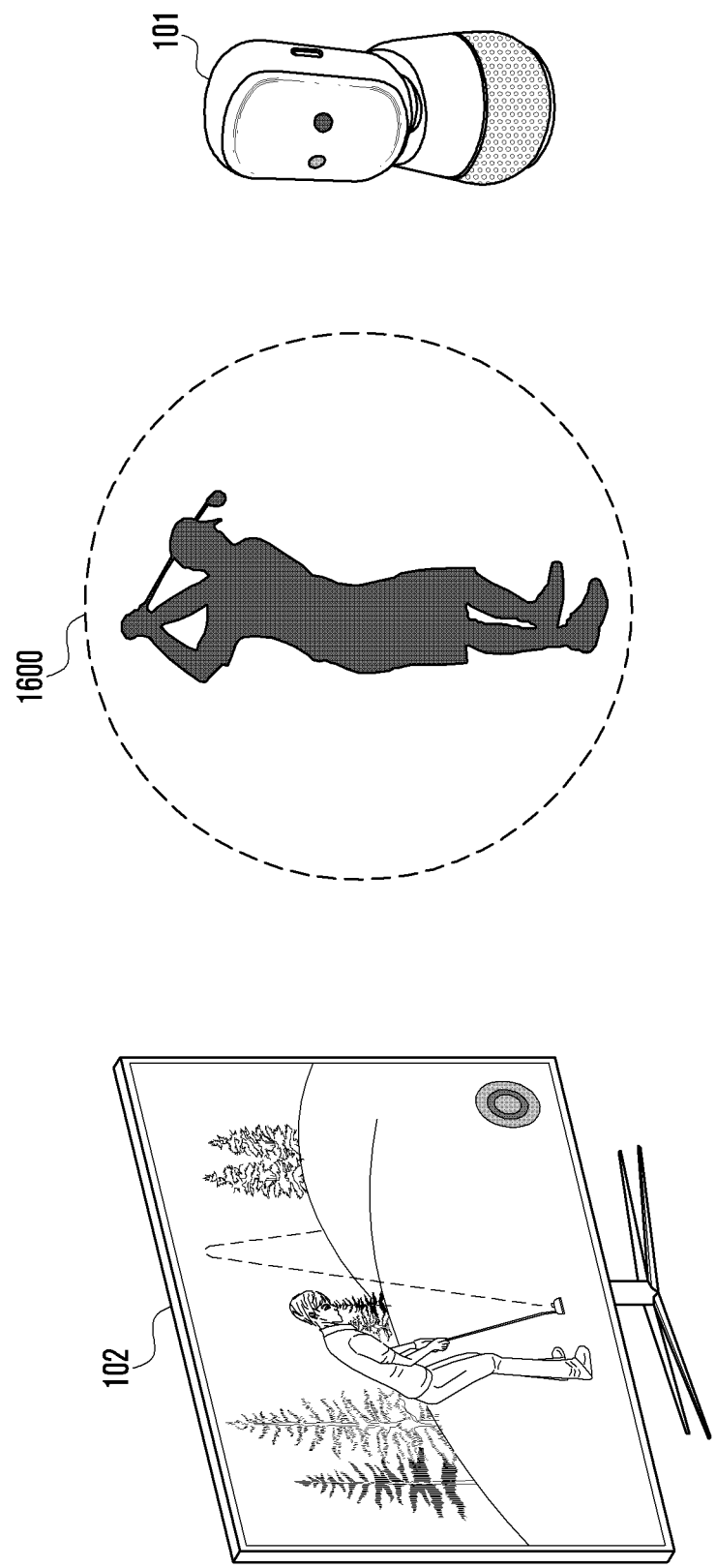
FIG. 16 is a diagram illustrating an example gesture detection area dependent on executed content according to various embodiments of the disclosure.

FIG. 16 is a diagram illustrating an example gesture detection area dependent on executed content according to various embodiments of the disclosure.

When game content requiring a large motion is executed in the external electronic device 102 connected to the electronic device 101, the electronic device 101 may move to another position or change a gesture detection area such that an effective gesture area contains a user's whole body 1600.

Figure 17:
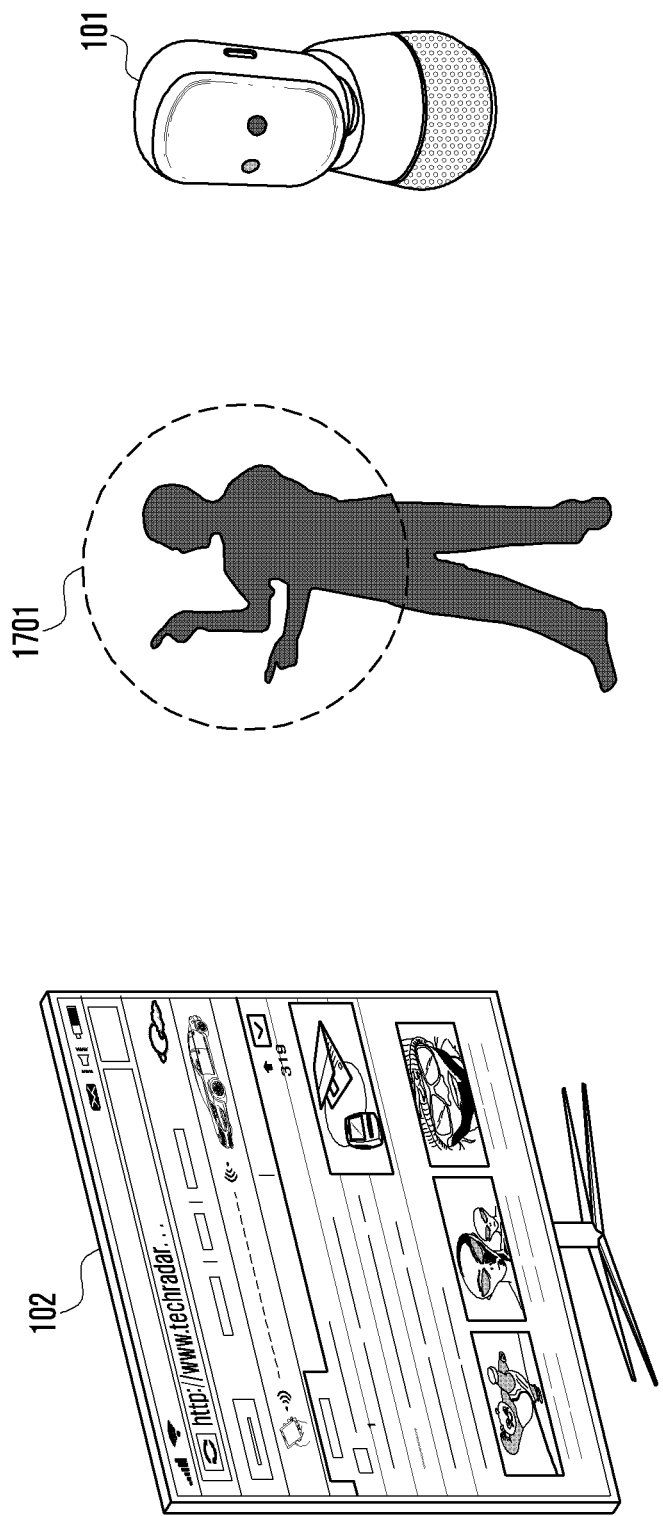
FIG. 17 is a diagram illustrating an example gesture detection area dependent on executed content according to various embodiments of the disclosure.

FIG. 17 is a diagram illustrating an example gesture detection area dependent on executed content according to various embodiments of the disclosure.

When content, such as a browser or a video player, requiring a relatively small motion is executed in the external electronic device 102 connected to the electronic device 101, the electronic device 101 may determine whether to move such that an effective gesture area contains only a user's upper body 1701.

The electronic device according to various embodiments may be one of various types of electronic devices. The electronic devices may include, for example, a portable communication device (e.g., a smart phone), a computer device, a portable multimedia device, a portable medical device, a camera, a wearable device, a home appliance, or the like. According to an embodiment of the disclosure, the electronic devices are not limited to those described above.

It should be appreciated that various example embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments thereof, it will be understood by those skilled in the art that various changes in form and details may be made therein without departing from the scope of the subject matter as defined, for example, by the appended claims and their equivalents.

What is claimed is:
1. An electronic device comprising:
one or more sensors;
a driving module comprising driving circuitry configured to move the electronic device;
a memory; and
a processor configured to execute instructions to control the electronic device to:
determine a first distance between the electronic device and a user using at least one of the one or more sensors;
based on the first distance being within a predefined range, acquire information corresponding to a gesture of the user through at least one of the one or more sensors in a first detection mode of the one or more sensors;
based on the first distance being outside of the predefined range, move the electronic device using the driving module such that the electronic device is located within the predefined range;
acquire the information corresponding to the gesture of the user through at least one of the one or more sensors in the first detection mode of the one or more sensors after a distance between the electronic device and the user is within the predefined range in response to the movement; and
when the one or more sensors fail to acquire the information in the first detection mode of the one or more sensors, change from the first detection mode to a second detection mode of the one or more sensors and acquire the information in the second detection mode of the one or more sensors.

2. The electronic device of claim 1, wherein the processor is further configured to control the electronic device to determine whether moving the electronic device is needed.

3. The electronic device of claim 2, wherein the processor is further configured to control the electronic device to determine a second distance between the electronic device and the user based on moving the electronic device being needed.

4. The electronic device of claim 2, wherein the processor is further configured to control the electronic device to determine whether moving the electronic device is needed based on a type of an application being executed in the electronic device or being executed in an external electronic device connected to the electronic device.

5. The electronic device of claim 1, wherein the one or more sensors include at least one of a proximity light sensor, a three-dimensional (3D) depth sensor, a gesture sensor, an acceleration sensor, a gyro sensor, a geomagnetic sensor, an infrared (IR) sensor, an ultrasonic sensor, a microphone, a camera sensor, a radio frequency (RF) sensor, or a touch sensor (or display).

6. A gesture recognition method of an electronic device, the method comprising:
determining a first distance between the electronic device and a user using at least one of one or more sensors;
based on the first distance being within a predefined range, acquiring information corresponding to a gesture of the user through at least one of one or more sensors; and
based on the first distance being outside of the predefined range, moving the electronic device using a driving module such that the electronic device is located within the predefined range;
acquiring the information corresponding to the gesture of the user through at least one of the one or more sensors in a first detection mode of the one or more sensors after a distance between the electronic device and the user is within the predefined range in response to the movement; and
when the one or more sensors fail to acquire the information in the first detection mode of the one or more sensors, changing from the first detection mode to a second detection mode of the one or more sensors and acquiring the information in the second detection mode of the one or more sensors.

7. The method of claim 6, further comprising:
determining whether moving the electronic device is needed.

8. The method of claim 7, further comprising:
determining a second distance between the electronic device and the user based on moving the electronic device being needed.

9. The method of claim 7, wherein the determining whether moving the electronic device is needed is performed based on a type of an application being executed in the electronic device or executed in an external electronic device connected to the electronic device.

10. The method of claim 6, wherein the one or more sensors includes at least one of a proximity light sensor, a three-dimensional (3D) depth sensor, a gesture sensor, an acceleration sensor, a gyro sensor, a geomagnetic sensor, an infrared (IR) sensor, an ultrasonic sensor, a microphone, a camera sensor, a radio frequency (RF) sensor, or a touch sensor (or display).

11. An electronic device comprising:
one or more sensors;
a driving module comprising driving circuitry configured to move the electronic device;
a memory; and
a processor configured to execute instructions to control the electronic device to:
determine a distance between the electronic device and a user using a position detecting sensor of the one or more sensors;
based on the determined distance being within a predefined range, detect a gesture of the user using a motion detecting sensor of the one or more sensors in a first detection mode of the one or more sensors;
based on the determined distance being outside of the predefined range, change from the first detection mode to a second detection mode of the one or more sensors and detect the gesture of the user using the motion detecting sensor of the one or more sensors in the second detection mode of the one or more sensors different from the first detection mode;
based on the determined distance being outside of the predefined range and failing to recognize the gesture after changing from the first detection mode to the second detection mode of the one or more sensors, control the electronic device to move the electronic device and detect the gesture of the user at a moved position using the motion detecting sensor of the one or more sensors in the second detection mode of the one or more sensors; and
perform a predefined action linked to the detected gesture.

12. The electronic device of claim 11, wherein the processor is further configured to control the electronic device to independently control a photodiode input of a pixel array of a camera module based on a corresponding detection mode of the first and second detection modes.

13. The electronic device of claim 12, wherein the processor is further configured to control the electronic device to change a resolution by turning on or off the photodiode of the pixel array of the camera module based on the distance.

14. The electronic device of claim 11, wherein the processor is further configured to control the electronic device to control a color filter layer configured to filter light incident on a photodiode by wavelength in an image sensor module of a camera module based on a corresponding detection mode of the first and second detection modes.

15. The electronic device of claim 11, wherein the processor is further configured to control the electronic device to change a mask or lens disposed in front of an IR emitter based on a corresponding detection mode of the first and second detection modes.

16. The electronic device of claim 11, wherein the processor is further configured to control the electronic device to compensate for a gesture input using a scale factor based on a corresponding detection mode of the first and second detection modes.

17. The electronic device of claim 11, wherein the processor is further configured to control the electronic device to differently set a gesture input area of the user based on a corresponding detection mode of the first and second detection modes.

18. The electronic device of claim 11, wherein the processor is further configured to control the electronic device to receive a gesture input from an external electronic device based on a corresponding detection mode of the first and second detection modes.

19. The electronic device of claim 11, wherein the processor is further configured to control the electronic device to recognize a finger gesture or recognize a gesture made by a motion of a large joint based on a corresponding detection mode of the first and second detection modes.

\* \* \* \* \*